US012574628B2

(12) United States Patent
Sakamaki

(10) Patent No.: US 12,574,628 B2
(45) Date of Patent: Mar. 10, 2026

(54) CONTROL APPARATUS, IMAGE CAPTURING APPARATUS, CONTROL METHOD, RECORDING MEDIUM, AND IMAGE CAPTURING SYSTEM

(71) Applicant: CANON KABUSHIKI KAISHA, Tokyo (JP)

(72) Inventor: Takuya Sakamaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 317 days.

(21) Appl. No.: 18/333,657

(22) Filed: Jun. 13, 2023

(65) Prior Publication Data

US 2023/0421885 A1 Dec. 28, 2023

(30) Foreign Application Priority Data

Jun. 22, 2022 (JP) ................................. 2022-100417

(51) Int. Cl.
H04N 23/611 (2023.01)
G06V 40/16 (2022.01)
H04N 23/60 (2023.01)

(52) U.S. Cl.
CPC ......... *H04N 23/611* (2023.01); *G06V 40/174* (2022.01); *H04N 23/64* (2023.01); *G06V 2201/07* (2022.01)

(58) Field of Classification Search
CPC ...... H04N 23/611; H04N 23/64; H04N 23/69; H04N 23/695; H04N 23/60; H04N 23/61; G06V 40/174; G06V 2201/07

USPC .......................................................... 382/103
See application file for complete search history.

(56) References Cited

U.S. PATENT DOCUMENTS

2017/0124427 A1* 5/2017 Park ..................... G06V 10/763
2019/0204914 A1* 7/2019 Tsuda ..................... G06V 40/19
2020/0186748 A1* 6/2020 Baba ........................ H04N 5/91
2020/0351437 A1* 11/2020 Vasconcelos .......... H04N 23/62

FOREIGN PATENT DOCUMENTS

JP 2021-057815 A 4/2021

* cited by examiner

*Primary Examiner* — Stephen P Coleman
(74) *Attorney, Agent, or Firm* — Cowan, Liebowitz & Latman, P.C.

(57) ABSTRACT

An apparatus controls an image capturing apparatus that obtains, through automatic shooting, an image to be provided to a user. The apparatus evaluates a state of a subject, determines, based on a result of the evaluation, whether to cause the image capturing apparatus to perform shooting, obtains demand information that indicates demand tendencies of a user respectively for state types of the subject, and controls an operation of the determination based on the demand information. The apparatus controls the operation of the determination so that a frequency at which the image capturing apparatus performs shooting varies in accordance with magnitudes of demands for the respective state types of the subject.

17 Claims, 9 Drawing Sheets

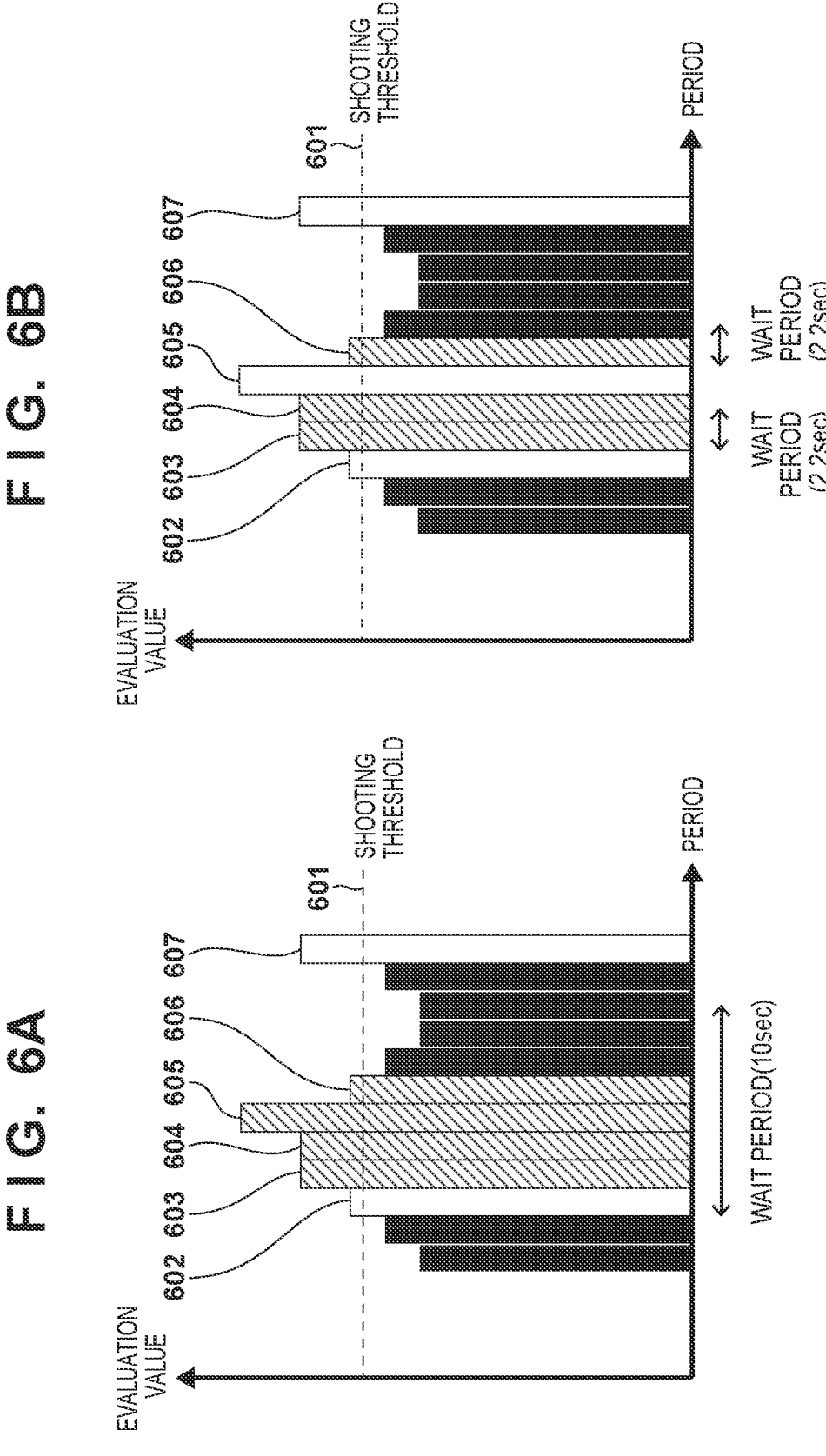
F I G. 6A
F I G. 6B

F I G.  8
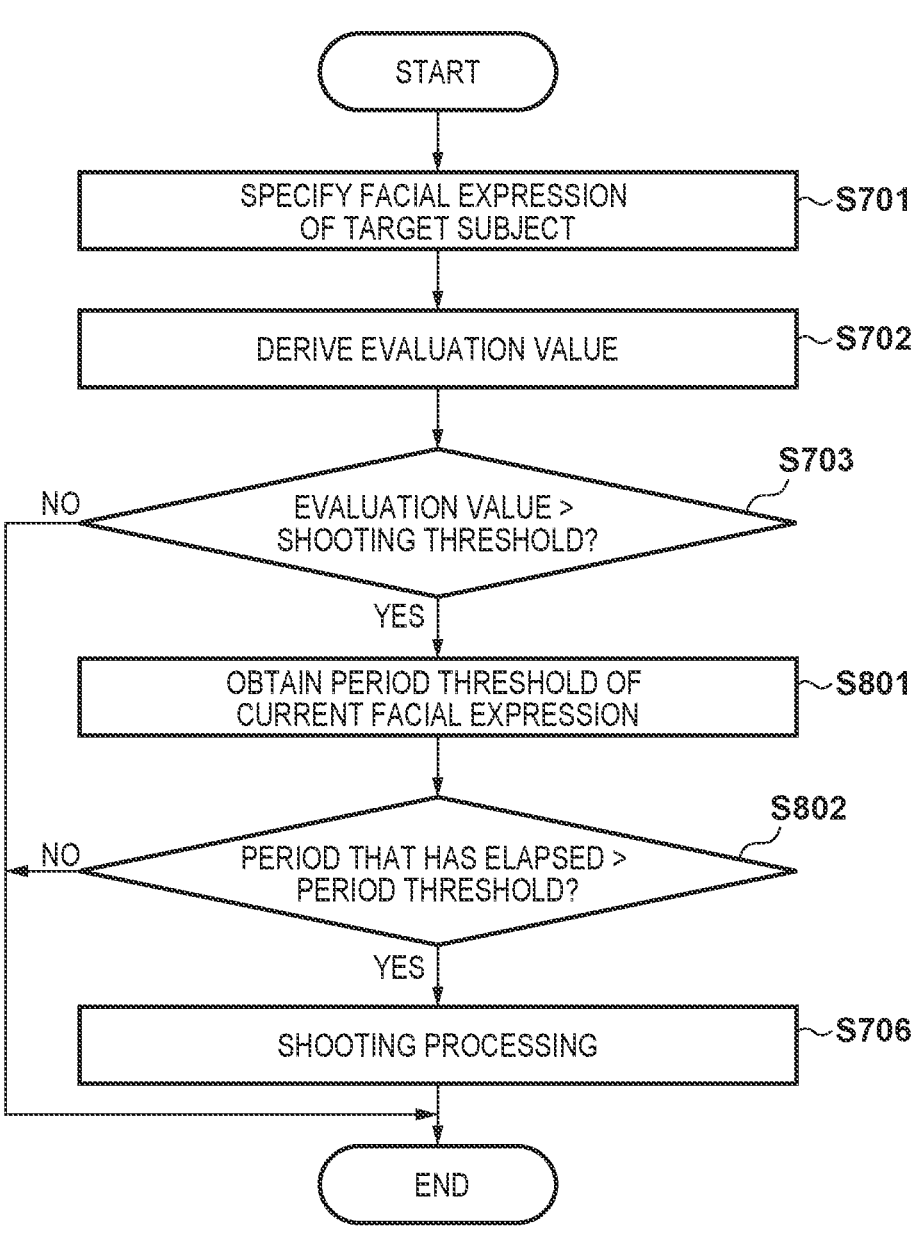
START
SPECIFY FACIAL EXPRESSION
OF TARGET SUBJECT          ~S701
DERIVE EVALUATION VALUE    ~S702
EVALUATION VALUE >
SHOOTING THRESHOLD?        S703
NO
YES
OBTAIN PERIOD THRESHOLD OF
CURRENT FACIAL EXPRESSION  ~S801
PERIOD THAT HAS ELAPSED >
PERIOD THRESHOLD?          S802
NO
YES
SHOOTING PROCESSING        ~S706
END

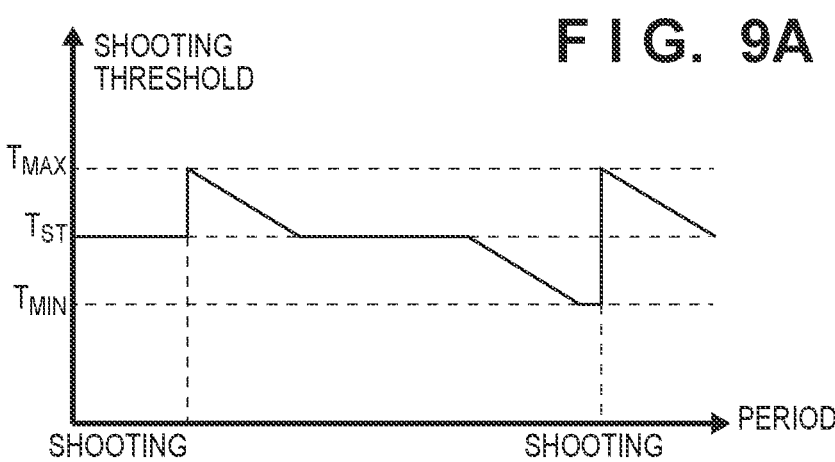
F I G. 9A
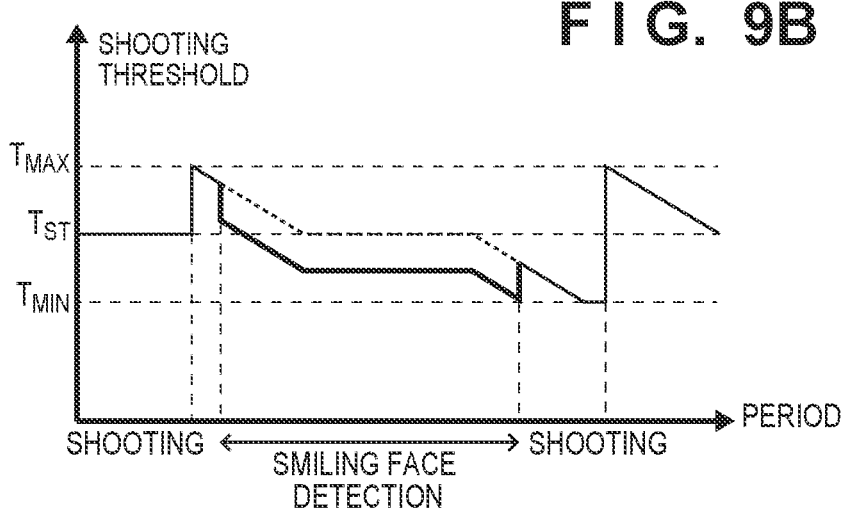
F I G. 9B
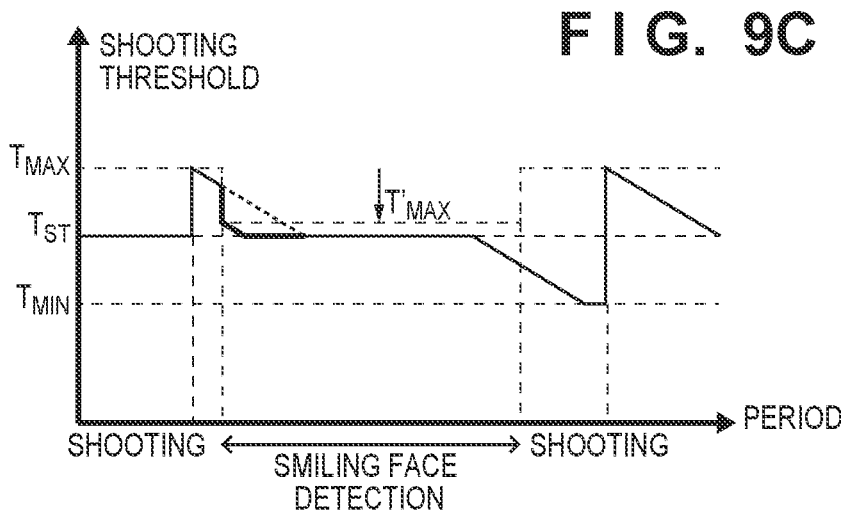
F I G. 9C

CONTROL APPARATUS, IMAGE CAPTURING APPARATUS, CONTROL METHOD, RECORDING MEDIUM, AND IMAGE CAPTURING SYSTEM

BACKGROUND OF THE INVENTION

Field of the Invention

The present invention relates to a control apparatus, an image capturing apparatus, a control method, a recording medium, and an image capturing system, and in particular to a system that performs automatic shooting by detecting a subject.

Description of the Related Art

There is an image capturing apparatus that performs shooting that is not subject to a shooting instruction input by a user (hereinafter may be referred to as automatic shooting), and records images (Japanese Patent Laid-Open No. 2021-057815). In recent years, the use of such an image capturing apparatus in festivals and events, such as sports festivals, recitals, and the like, as well as the development of a service that makes images recorded through automatic shooting available for a user, has been envisaged.

Meanwhile, the image capturing apparatus described in Japanese Patent Laid-Open No. 2021-057815 is controlled so that re-shooting is not performed for a predetermined period after the execution of a shooting operation in order to avoid recording of many similar images. However, such control on the shooting operation gives rise to a possibility that the number of times shooting is performed in the scenes that meet the user's demand is reduced.

SUMMARY OF THE INVENTION

The present invention has been made in view of the aforementioned problem, and provides a control apparatus, an image capturing apparatus, a control method, a recording medium, and an image capturing system that realize automatic shooting by which a subject in a state desired by a user is easily recorded.

The present invention in its first aspect provides a control apparatus that controls an image capturing apparatus that obtains, through automatic shooting, an image to be provided to a user, the control apparatus comprising at least one processor and/or circuit configured to function as the following units: an evaluation unit configured to evaluate a state of a subject; a determination unit configured to, based on a result of the evaluation made by the evaluation unit, determine whether to cause the image capturing apparatus to perform shooting; an obtainment unit configured to obtain demand information that indicates demand tendencies of a user respectively for state types of the subject; and a control unit configured to control an operation of the determination unit based on the demand information obtained by the obtainment unit, wherein the control unit controls the operation of the determination unit so that a frequency at which the image capturing apparatus performs shooting varies in accordance with magnitudes of demands for the respective state types of the subject.

The present invention in its second aspect provides an image capturing apparatus, comprising: an image capturing unit; the control apparatus according to the first aspect; and a recording unit configured to, in a case where the determination unit has determined to cause shooting to be performed, record an image shot by the image capturing unit.

The present invention in its third aspect provides a control method for a control apparatus that controls an image capturing apparatus that obtains, through automatic shooting, an image to be provided to a user, the control method comprising: evaluating a state of a subject; based on a result of the evaluation made in the evaluating, determining whether to cause the image capturing apparatus to perform shooting; obtaining demand information that indicates demand tendencies of a user respectively for state types of the subject; and controlling the determination based on the demand information obtained in the obtaining, wherein in the controlling, the determination is controlled so that a frequency at which the image capturing apparatus performs shooting varies in accordance with magnitudes of demands for the respective state types of the subject.

The present invention in its fourth aspect provides a computer-readable recording medium having recorded therein a program for causing a computer to function as each unit of the control apparatus according to the first aspect.

The present invention in its fifth aspect provides an image capturing system that provides, to a user, an image obtained through automatic shooting performed by an image capturing apparatus, the image capturing system including the image capturing apparatus, a control apparatus that controls the image capturing apparatus, and a collection server that collects demand tendencies of the user based on the image provided to the user, the control apparatus including at least one processor and/or circuit configured to function as the following units: an evaluation unit configured to evaluate a state of a subject; a determination unit configured to, based on a result of the evaluation made by the evaluation unit, determine whether to cause the image capturing apparatus to perform shooting; an obtainment unit configured to obtain, from the collection server, demand information that indicates demand tendencies of a user respectively for state types of the subject; and a control unit configured to control an operation of the determination unit based on the demand information obtained by the obtainment unit, wherein the control unit controls the operation of the determination unit so that a frequency at which the image capturing apparatus performs shooting varies in accordance with magnitudes of demands for the respective state types of the subject.

Further features of the present invention will become apparent from the following description of exemplary embodiments (with reference to the attached drawings).

BRIEF DESCRIPTION OF THE DRAWINGS

FIGS. 6A and 6B are diagrams for describing a wait period in automatic shooting according to a first embodiment of the present invention.

FIG. 8 is a flowchart exemplarily showing processing related to shooting determination in an automatic shooting sequence according to a first modification example of the present invention.

FIGS. 9A, 9B and 9C are diagrams for describing processing related to shooting determination according to a second embodiment of the present invention.

DESCRIPTION OF THE EMBODIMENTS

First Embodiment

Figure 1:
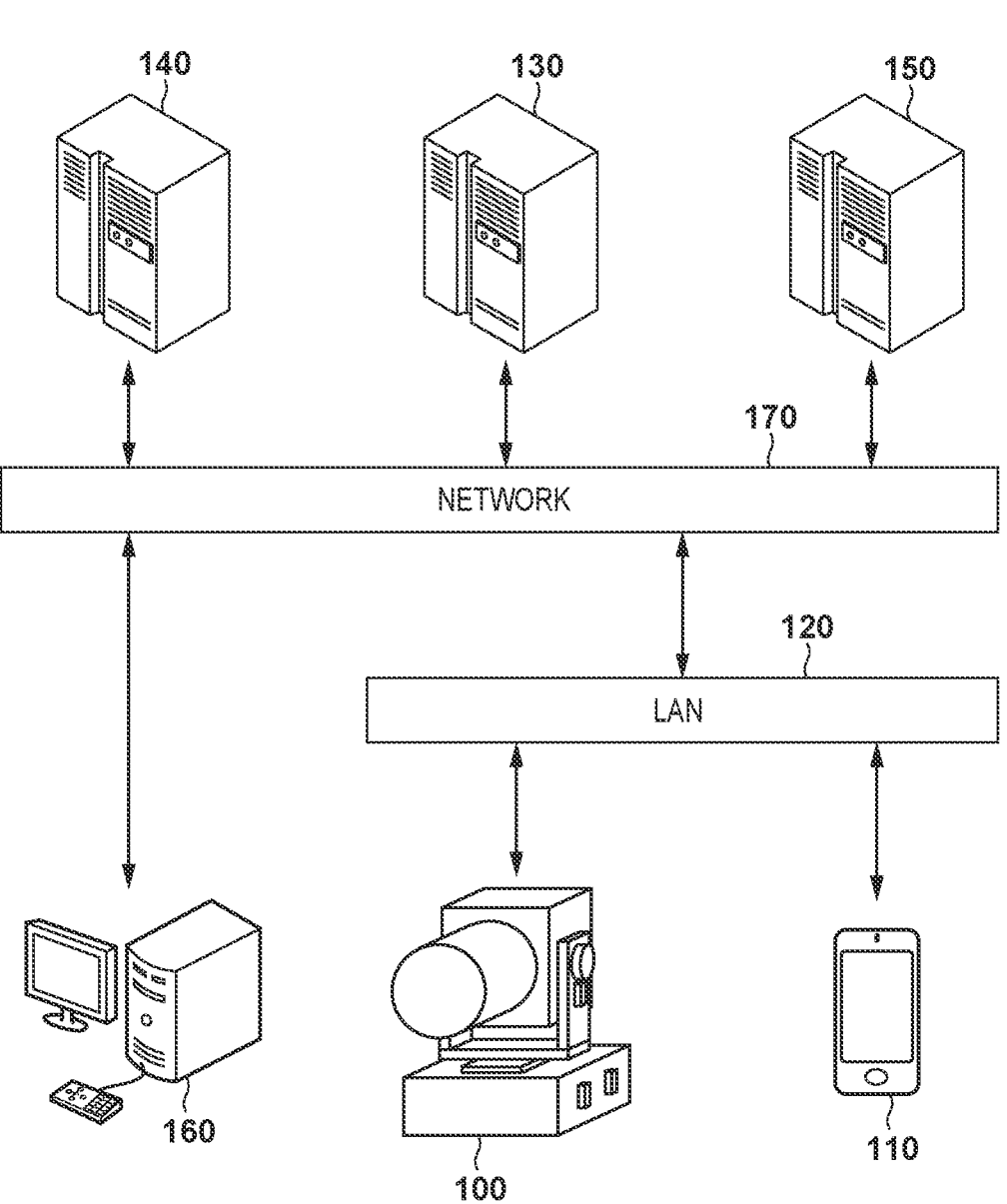
FIG. 1 is a diagram exemplarily showing a configuration of an image capturing system according to embodiments and modification examples of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

An embodiment described below pertains to an example in which the present invention is applied to an image capturing apparatus capable of shooting images to be provided to a user when a predetermined condition has been satisfied (automatic shooting), as one example of a control apparatus. However, the present invention is applicable to any device capable of controlling the timings of shooting on an image capturing apparatus capable of performing automatic shooting, irrespective of an operational input performed by a user.

Furthermore, in the present specification, it is assumed that "automatic shooting" is not shooting that is performed upon acceptance of an operational input performed by a user in relation to a shooting instruction, but is shooting that is performed upon determining that shooting should be performed in a current status via scene recognition on a specific apparatus. Here, it is assumed that a "scene" refers to an environment captured by the image capturing apparatus, and may refer to, in a narrow sense, a space that can be captured within the angle of view of the image capturing apparatus with a panning or tilting operation. A captured image, an output from an external sensor, and the like can be used in scene recognition, and the automatic shooting is executed in a case where, for example, the result this recognition satisfies a predetermined shooting condition.

Configuration of Image Capturing System

FIG. 1 is a diagram schematically showing a configuration of an image capturing system according to an embodiment of the present invention.

The image capturing system of the present embodiment provides a service that sells, to a user, images obtained by an image capturing apparatus 100, which is placed in a predetermined scene, performing automatic shooting with respect to a subject in this scene (hereinafter referred to as recorded images). Although the details will be described later, the image capturing apparatus 100 is configured to be capable of autonomously executing shooting related to image recording, irrespective of an operational input performed by a user. Although the recorded images may be still images or moving images, they are described as still images in the present embodiment in order to facilitate the understanding of the invention.

In the system of FIG. 1, the recorded images obtained through automatic shooting performed by the image capturing apparatus 100 are transmitted, via a communication terminal 110 connected to the same local area network (LAN) 120, to a data server 130 in a network 170. The LAN 120 may be a network configured using wired or wireless connections, and realizes mutual information communication between the image capturing apparatus 100 and the communication terminal 110. Furthermore, the LAN 120 is connected to the network 170 via a non-illustrated router. The network 170 is, for example, a wide-area network, such as the Internet, and enables information communication between an apparatus outside the LAN 120 and the communication terminal 110.

The data server 130 is a server that accumulates recorded images. Although only one image capturing apparatus 100 is shown in the example of FIG. 1, the number of image capturing apparatuses 100 that shoot recorded images is not limited to one, and a plurality of image capturing apparatuses may be included. In this case, the data server 130 collects and accumulates recorded images shot by each image capturing apparatus 100.

A provider server 140 provides a service that sells recorded images accumulated in the data server 130 to users (hereinafter referred to as a shooting sales service). To use the shooting sales service, each user causes a client terminal 160, which may be an electronic device such as a PC, a smartphone, and the like, to access a predetermined site (a service providing site) related to the provider server 140 via a browsing application. On the service providing site of the present embodiment, a user logs into the shooting sales service using identification information unique to the user; as a result, the user can view images related to the user among the recorded images accumulated in the data server 130, and select and purchase desired recorded images from among the same. Here, the recorded images related to the user are equivalent to, for example, images that include the user as an individual, a family member or an acquaintance of the user, a person connected to the user, or the like as a subject, and images with an attribute designated by the user, such as an event attended by the user. The recorded images purchased by a user may be provided to the user, for example, in a mode in which high-resolution data is downloaded, in a mode in which the recorded images are printed on predetermined sheets and mailed, and so forth.

A collection server 150 manages pieces of demand information, which are analyses on the demand tendencies of users, based on information of recorded images purchased by each user of the shooting sales service (purchase information). The image capturing system of the present embodiment is described under the assumption that the pieces of demand information are managed on a per-user basis, that is to say, demand information related to one user is configured based on purchase information of this user. Although the details will be described later, demand information is information that is referenced in controlling whether to perform automatic shooting on the image capturing apparatus 100, and is obtained by analyzing the tendencies of recorded images that a user wishes to attain (demand tendencies) from the state types of a subject in the recorded images purchased by the user. In a case where the user desires the automatic shooting by the image capturing apparatus 100, demand information based on past purchase information of the user is transmitted to the image capturing apparatus 100; as a result, the operations of the image capturing apparatus 100 are controlled so that the automatic shooting is performed at timings at which the subject is in a state that is highly demanded by the user. Consequently, the automatic shooting is performed with respect to recorded images that are likely to be purchased by the user; therefore, from the viewpoint of the user, recorded images that show the subject in a desired state are more easily attained, whereas from the viewpoint of the service provider, a sales increase is expected.

Although the details will be described later, with regard to recorded images purchased by a user, the collection server 150 of the present embodiment specifies facial expressions of a person related to the user (e.g., a family member) shown in these recorded images, and analyzes the demand tendency of the user for each facial expression. It is assumed that the analysis is performed through machine learning, and the collection server 150 obtains the result of learning related to the demand tendencies of the user by specifying the types of facial expressions (a smiling face, a crying face, and so forth) of the subject shown in the recorded images that have been purchased, and learning the proportion of each facial expression in the entire recorded images that have been purchased.

Note that although the present embodiment is described under the assumption that the apparatuses that compose the image capturing system are in the mode of FIG. 1 for simplicity, the present invention is not limited to being embodied in this way. Each of the functions (e.g., recording of images, sales, and learning) of the respective apparatuses, such as servers, is not necessarily limited to being executed by one apparatus; a part of the functions may be executed by a plurality of apparatuses operating in coordination, or a plurality of functions may be executed by one apparatus. Furthermore, a part of the functions executed by such apparatuses as servers may be executed by the image capturing apparatus 100.

Configuration of Image Capturing Apparatus 100

Next, the configuration and the functional configuration of the image capturing apparatus 100 of the present embodiment will be described in detail using FIGS. 2A, 2B, and 3.

Figure 2A:
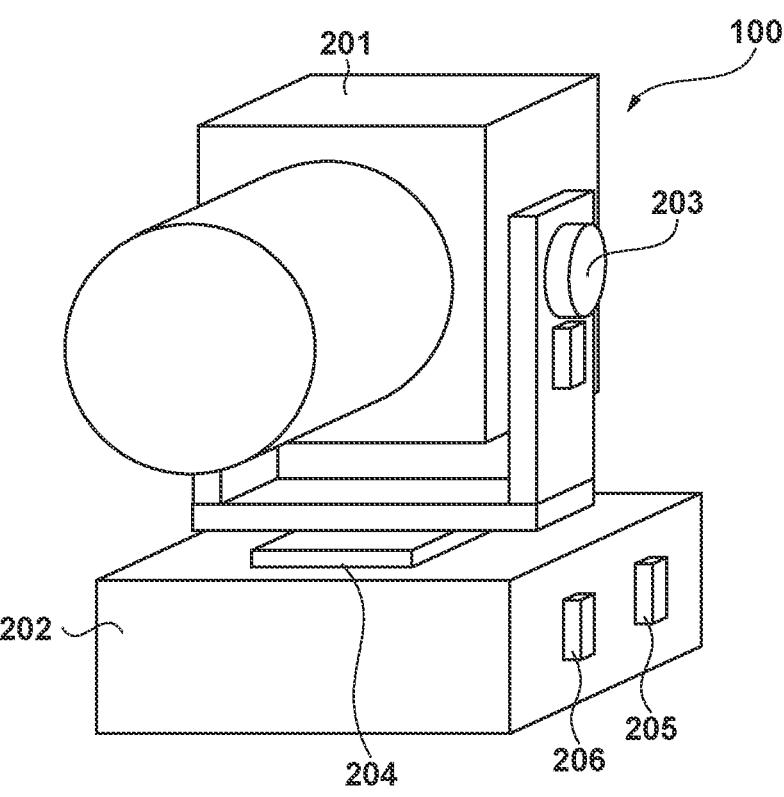
FIGS. 2A and 2B are diagrams for describing an image capturing apparatus 100 according to embodiments and modification examples of the present invention.
Figure 2B:
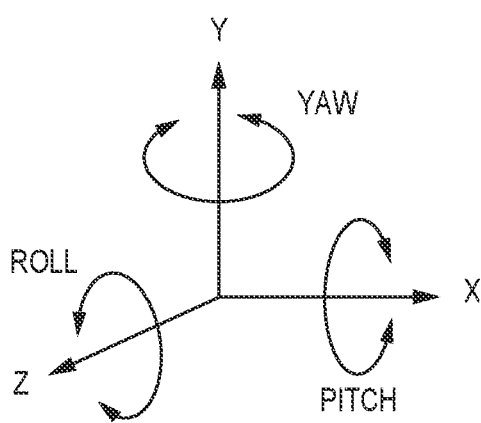

FIG. 2A schematically shows an external configuration of the image capturing apparatus 100. As shown in the figure, a lens barrel 201, which is a housing including a photographing lens assembly and an image sensor that perform image capture, is attached to a fixed unit 202, via a rotation mechanism, on the image capturing apparatus 100. In the example of the figure, a fixed three-dimensional coordinate system (an XYZ Cartesian coordinate system) is set with respect to the fixed unit 202. As shown in FIG. 2B, the rotation mechanism includes a tilt rotation unit 203 that causes the lens barrel 201 to rotate in a pitch direction around the X-axis, and a pan rotation unit 204 that causes the lens barrel 201 to rotate in a yaw direction around the Y-axis. That is to say, in the image capturing apparatus 100 of the present embodiment, the lens barrel 201 is configured to be capable of changing the image capturing direction using the biaxial rotation mechanism that includes the tilt rotation unit 203 and the pan rotation unit 204.

The fixed unit 202 of the image capturing apparatus 100 is provided with an angular velocity meter 205 and an accelerometer 206 that detect vibrations and motions of the image capturing apparatus 100 and the lens barrel 201.

When a later-described shake detection unit 309 has detected a vibration based on the outputs from the angular velocity meter 205 and the accelerometer 206, control is performed on driving of at least one of the tilt rotation unit 203 and the pan rotation unit 204 so as to perform blur correction and inclination correction.

Figure 3:
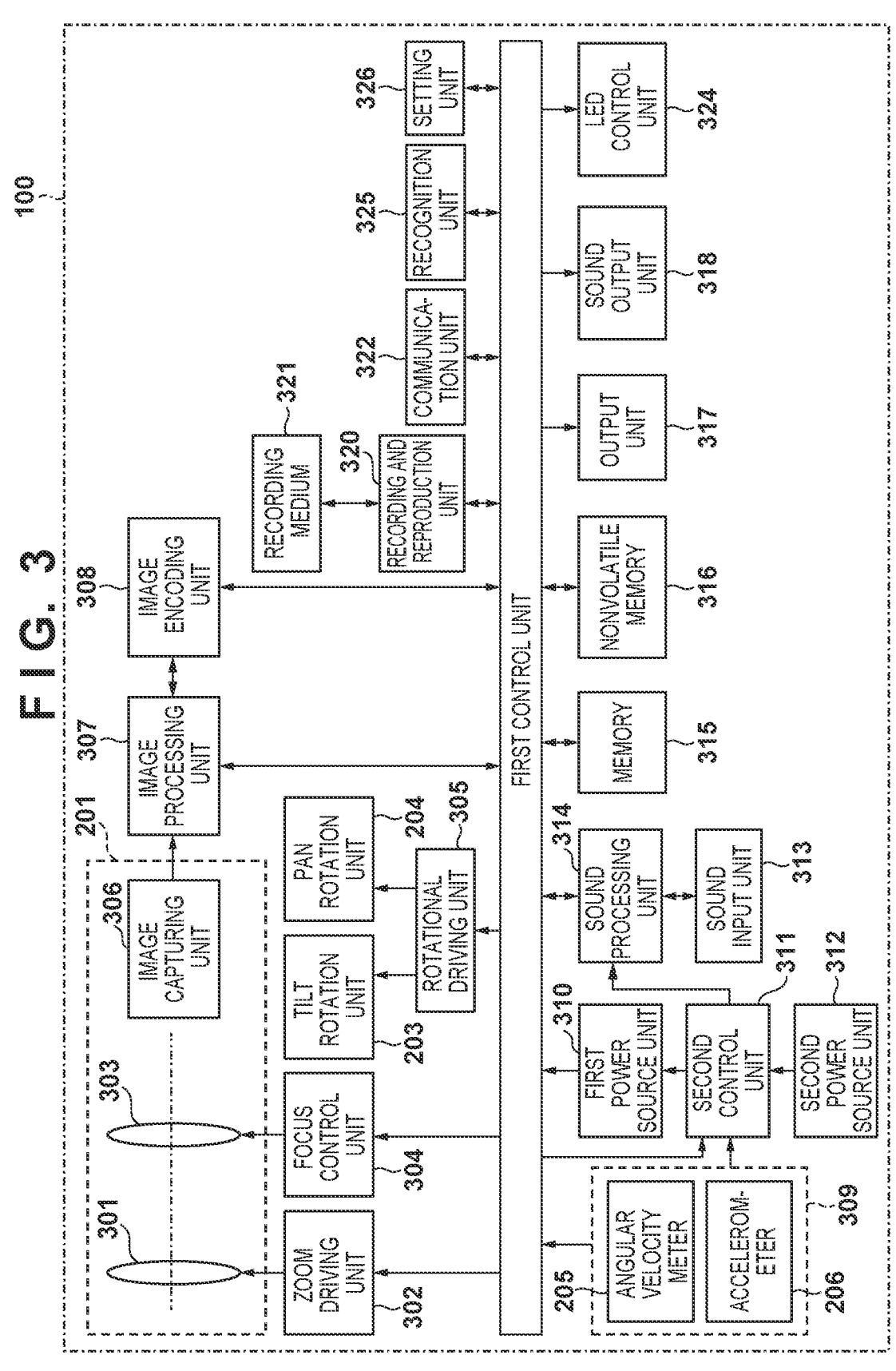
FIG. 3 is a block diagram exemplarily showing a functional configuration of the image capturing apparatus 100 according to embodiments and modification examples of the present invention.

FIG. 3 is a block diagram exemplarily showing the functional configuration of the image capturing apparatus 100.

A first control unit 323 is configured to include a processor (e.g., a CPU, a GPU, a microprocessor, an MPU, or the like) and a memory (e.g., a DRAM, an SRAM, or the like). They control the operations of the blocks of the image capturing apparatus 100, and control data transfer among the blocks, by executing various types of processing. A non-volatile memory (Flash ROM) 316 is an electrically erasable and recordable memory, and stores, for example, constants and programs for the operations of the first control unit 323.

The lens barrel 201 includes a zoom unit 301 having a zoom lens that performs variable magnification, and a focus unit 303 having a lens that performs focus adjustment. Driving of the zoom unit 301 is controlled by a zoom control unit 302, and driving of the focus unit 303 is controlled by a focus control unit 304.

An image capturing unit 306 includes the image sensor, receives light incident thereon via a lens assembly, and outputs, to an image processing unit 307, digital image data obtained by applying analog-to-digital (A/D) conversion to information of charges corresponding to the amount of the incident light. The image processing unit 307 applies various types of image processing to input image data. When image data has been input from the image capturing unit 306, the image processing unit 307 applies image processing, such as distortion correction, white balance adjustment, and color interpolation processing, to this image data, and outputs the resultant digital image data. The digital image data output from the image processing unit 307 is converted into a recording format, such as a JPEG format, in an image encoding unit 308, and transmitted to a memory 315 and a later-described output unit 317.

A rotational driving unit 305 rotates and drives the lens barrel 201 in the pitch direction and the yaw direction by driving the tilt rotation unit 203 and the pan rotation unit 204. The rotation and driving of the lens barrel 201 caused by the rotational driving unit 305 are used not only to change the image capturing direction, but also to perform blur correction for cancelling out a vibration of the image capturing apparatus 100. The shake detection unit 309 includes the angular velocity meter 205 that detects the angular velocities of the image capturing apparatus 100 in the directions of the three axes, and the accelerometer 206 that detects the accelerations of the apparatus in the directions of the three axes, as described earlier. In this case, a rotation angle, a shift amount, and the like of the image capturing apparatus 100 are derived based on the signals detected by the shake detection unit 309, and used in driving and control of the rotational driving unit 305.

A sound input unit 313 obtains, from a non-illustrated microphone provided in the image capturing apparatus 100, sounds around the image capturing apparatus 100 as a sound signal, applies A/D conversion to the sound signal, and transmits the resultant sound signal to a sound processing unit 314. The sound processing unit 314 executes sound-related processing, such as processing for making the input digital sound data appropriate. Then, the first control unit 323 transmits the sound data processed by the sound processing unit 314 to the memory 315. The memory 315 temporarily stores image data and sound data obtained by the image processing unit 307 and the sound processing unit 314.

In a case where recording is performed at the time of shooting and the like, the image processing unit 307 and the sound processing unit 314 read out the image data and the sound data that have been temporarily stored in the memory 315, execute processing for encoding image signals, encoding the sound data, and so forth, and generate compressed image data and compressed sound data. The first control unit 323 transmits such compressed image data and compressed sound data to a recording and reproduction unit 320.

The recording and reproduction unit 320 records the compressed image data and the compressed sound data that have been generated by the image processing unit 307 and the sound processing unit 314, other control data related to shooting, and the like into a recording medium 321. Furthermore, in a case where compression encoding is not applied to the sound data, the first control unit 323 transmits the sound data generated by the sound processing unit 314 and the compressed image data generated by the image processing unit 307 to the recording and reproduction unit 320, and records them into the recording medium 321.

The recording medium 321 may be a recording apparatus built in the image capturing apparatus 100, or may be a storage apparatus configured to be attachable to and removable from the image capturing apparatus 100. The recording medium 321 can hold various types of data, such as compressed image data and compressed sound data generated by the image capturing apparatus 100, recorded therein, and a storage apparatus having a larger capacity than the nonvolatile memory 316 is typically used thereas. The recording medium 321 may include, for example, recording apparatuses based on a variety of methods, such as a hard disk, an optical disc, a magneto-optical disc, a CD-R, a DVD-R, a magnetic tape, a nonvolatile semiconductor memory, and a flash memory.

The recording and reproduction unit 320 reads out (reproduces) various types of data recorded in the recording medium 321, such as compressed image data and compressed sound data. Then, the first control unit 323 transmits the compressed image data and the compressed sound data that have been read out to the image processing unit 307 and the sound processing unit 314. The image processing unit 307 and the sound processing unit 314 temporarily stores the compressed image data and the compressed sound data into the memory 315, decodes them in a predetermined procedure, and transmits the decoded signals to the output unit 317 and a sound output unit 318.

Note, it is assumed that the sound input unit 313 includes a plurality of non-illustrated microphones, the sound processing unit 314 can detect the directions of sounds in planes in which the plurality of microphones are placed, and such directions are used in a later-described search and automatic shooting. Furthermore, the sound processing unit 314 may be configured to be capable of detecting specific sound commands. The sound commands may be configured to be capable of including commands that have been registered in advance, and in addition, specific sounds that have been registered by users. Furthermore, the sound processing unit 314 may also be capable of recognizing sound scenes. In recognition of sound scenes, a network that has been trained using machine learning based on a massive amount of sound data that has been prepared in advance, determines a scene (a sound scene) in which shooting is performed. For example, a network for detecting specific scenes in which "a cheer has arisen", "an applause has been given", "a voice has been uttered", and the like may be set in the sound processing unit 314 and detectable. In this case, the sound processing unit 314 may be configured to, upon detecting a specific sound scene or a specific sound command, output a detection trigger signal to the first control unit 323 and a second control unit 311.

The second control unit 311 is a control apparatus that is provided separately from the first control unit 323, and controls a supply of power to the first control unit 323. It is assumed that the image capturing apparatus 100 of the present embodiment includes two types of control apparatuses, namely the first control unit 323 and the second control unit 311, so that it can be activated in accordance with not only an operational input performed on an operation member, such as a power switch and the like, but also the aforementioned sound commands and the result of detection performed by the shake detection unit 309. More specifically, in a case where only a limited function, such as sound detection by the sound processing unit 314 and shake detection by the shake detection unit 309, is executed, only the second control unit 311 is brought into operation, controls these units, and determines whether an activation condition of the image capturing apparatus 100 has been satisfied. Then, in a case where the second control unit 311 has determined that the activation condition has been satisfied, it causes a first power unit 310 to supply power to the first control unit 323 so that the operations of all blocks of the image capturing apparatus 100, including shooting, are controlled. The first control unit 323 starts the control in accordance with the determination made by the second control unit 311, and performs various types of operations corresponding to the factor for the activation. Therefore, a second power unit 312 is a power circuit configured to be in an ON state constantly when power has been supplied from a battery connected to the image capturing apparatus 100 or external power has been supplied via an adapter or a USB, and supplies power to the second control unit 311.

An LED control unit 324 controls LEDs provided in the image capturing apparatus 100 so that the LEDs are lit or flash in a preset pattern at the time of, for example, shooting and the like. The sound output unit 318 outputs a preset sound pattern from a speaker built in the image capturing apparatus 100 at the time of, for example, shooting and the like. The output unit 317 is composed of, for example, a video output terminal, and outputs image signals so as to cause a connected external display and the like to display a video. The sound output unit 318 and the output unit 317 may be a single united terminal, for example, a terminal like a High-Definition Multimedia Interface (HDMI®) terminal.

A communication unit 322 is, for example, a communication interface with an external apparatus included in the image capturing apparatus 100, such as an infrared communication module, a Bluetooth® communication module, and a wireless LAN communication module. The communication unit 322 transmits and receives, for example, sound data and image data to and from an external apparatus. In the present embodiment, the image capturing apparatus 100 performs information communication with the communication terminal 110 via the communication unit 322, and transmits recorded images or receives demand information related to the result of learning of the collection server 150. Furthermore, the communication unit 322 may also receive a control signal related to shooting, such as a shooting start or completion command, and panning, tilting or zoom driving, from an external device; in this case, the received control signal is transmitted to the first control unit 323, and driving and control of the image capturing apparatus 100 are performed. Note that although the present embodiment is described under the assumption that the recorded images obtained through shooting performed by the image capturing apparatus 100 are transmitted to the data server 130 via the communication terminal 110, the present invention is not limited to being embodied in this way. The recorded images may be transmitted to the data server 130 directly via communication and connection between the image capturing apparatus 100 and the data server 130.

A recognition unit 325 detects a face of a person who exists in a scene, and executes face recognition processing for recognizing whose face this detected face is, and in particular, whether this detected face belongs to a person to be shot. In the shooting sales service of the present embodiment, the face of a person (subject) to be shot varies depending on a user who uses the same. Therefore, in the image capturing apparatus 100, in a case where a request for automatic shooting has been accepted from a user, a face image of a subject is obtained prior to the automatic shooting. For example, the face image of the subject may be received from a terminal used by the user who made the request for the automatic shooting, may be obtained from the collection server 150, the data server 130, or the like as a face image that has been registered in association with the user, or may be obtained by the image capturing apparatus 100 through preliminary shooting. Therefore, the recognition unit 325 executes face detection processing with respect to captured images that are obtained intermittently during the activation of the image capturing apparatus 100, and in a case a face has been detected, determines whether this face matches the face image of the person to be shot through the face recognition processing. The face recognition processing may use a 2D recognition method that recognizes, for example, the positions of the eyes, nose, mouth, and the like of the face, and performs recognition via cross-referencing with a database, and may further use a 3D recognition method that performs recognition using an infrared sensor and a dot projector.

A setting unit 326 sets a shooting condition under which the automatic shooting is performed. Although the details will be described later, as the image capturing apparatus 100 of the present embodiment performs the automatic shooting without accepting an operational input related to a shooting instruction from a user, a shooting condition indicating under which condition the shooting is performed is set. Although the shooting condition may be set in any manner, it is assumed in a mode described below that the shooting condition is set in relation to an evaluation value obtained by evaluating a degree to which the state of the subject is appropriate for shooting (a degree of appropriateness for shooting). An evaluation value related to a degree of appropriateness may be obtained by evaluating a captured image in relation to, for example, such evaluation standards as the status of face detection, the result of face recognition, a degree to which the subject is closing their eyes, a facial expression of the face of the subject, the direction of the face, and the size of a subject region. It is assumed that the evaluation value is derived, for example, each time a captured image has been obtained, and it is determined that shooting is to be performed in a case where this evaluation value exceeds a preset shooting threshold. That is to say, the higher the evaluation value is, the more the evaluation value indicates that the scene being captured by the image capturing apparatus 100 is appropriate for shooting. Therefore, the shooting condition may determine a method of deriving this shooting threshold and the shooting threshold.

Overview of Shooting Sales Service

The following describes an overview of the shooting sales service that is provided using the image capturing system of the present embodiment. The shooting sales service is roughly divided into a shooting stage in which the image capturing apparatus 100 performs automatic shooting upon receiving a request for shooting a predetermined subject (person) from a user, and a sales stage in which the user selects and purchases desired images from among the recorded images that have been recorded through the automatic shooting. The shooting request may be accepted as a result of, for example, the user operating an operational input member provided in the communication terminal 110, or may be accepted when the communication terminal 110 has received corresponding information from a communication terminal used by the user. Alternatively, the shooting request may be accepted via a non-illustrated operational input member provided in the image capturing apparatus 100. Upon accepting the shooting request, the communication terminal 110 transmits information indicating the same to the image capturing apparatus 100 via the LAN 120. At this time, a login to the shooting sales service is required to make the shooting request, and the user is identified based on this login.

The shooting stage is equivalent to, for example, a period in which an event to be shot, such as a sports festival and a school play, is held. The image capturing apparatus 100 is, for example, placed in advance inside a venue or the like by an event organizer or the like; while the event is taking place, it captures images of the venue, and performs shooting and records recorded images in a case where the set shooting condition has been satisfied. The image capturing apparatus 100 may be placed in a mode in which it is fixed (mounted) on, for example, a panhead or a base, or in a mode in which it is movably installed on a car or the like. A subject to be shot is a person associated with the user who made the shooting request; for example, in an event like a sports festival, the subject may be a (user's) child (a pupil) who participates in a competition in this sports festival. Recorded images are uploaded and accumulated in the data server 130 via the communication terminal 110, either in sequence while the event is taking place, or at a predetermined timing after the event has finished.

On the other hand, the sales stage is equivalent to, for example, a period in which, after the upload of the recorded images recorded in the shooting stage to the data server 130 has been completed, a Web page for viewing corresponding to the event (hereinafter referred to as a sales page) is set up on the provider server 140. More specifically, the sales stage is equivalent to a period in which an authority to access this sales page in the service providing site has been granted to the user. The user can access the service providing site from the client terminal 160 via the browsing application (a browser), and view the sales page for which the user has been granted the authority to access by performing a login with inputting of a user ID and a password. On the sales page, the content of each recorded image can be confirmed, whether to purchase each recorded image can be selected, and a payment procedure related to the purchase of the selected recorded images can be performed.

The image capturing system of the present embodiment performs control in which demand information indicating the demand tendencies of a user is updated based on purchase information as needed, and the shooting frequency in automatic shooting is changed based on this demand information in the shooting stage when the shooting sales service is used thereafter. In other words, the shooting sales service not only performs automatic shooting and image sales that are completed for one event, but also learns the demands of the user based on purchase information of the user related to one event, and reflects the demands in shooting control in automatic shooting for other events. As a result, in the shooting stage, control is performed so as to increase the shooting frequency when a subject is in a state (has a facial expression) that is highly demanded by the user, and the number of recorded images that are shot in this state can be increased. Furthermore, in the sales stage, the user, or user, can select images to be purchased from among a larger number of recorded images that match their preference, and a business operator who provides the service can expect an increase in the profits.

Therefore, in providing the shooting sales service of the present embodiment, processing of the following sequence is executed in the image capturing system. Note that the following describes, as an example of the present invention, a mode in which in a case where one user has made a request for shooting their child with respect to an event in which the present image capturing system is used, the image capturing apparatus 100 performs automatic shooting of scenes that include this child in response to this request.

User Registration Sequence

In the shooting sales service of the present embodiment, a person associated with a user who has made a shooting request is selected as a subject in the shooting stage, as stated earlier. That is to say, it is necessary that the subject for the user who uses the service needs to be set prior to the beginning of the shooting stage. Furthermore, in order to control the shooting frequency in automatic shooting based on past purchase information, it is necessary to recognize who the user is, and obtain past purchase information of this user, or information of demand tendencies that have been learned based thereon, prior to the beginning of the shooting stage.

Therefore, it is assumed that each user has performed user registration to use the shooting sales service. In the image capturing system of the present embodiment, processing related to the user registration is executed in the provider server 140. It is sufficient to configure the user registration so that, for example, it can be performed on the service providing site related to the provider server 140, and each user performs the user registration by accessing the service providing site from the client terminal 160 with use of a browser. Once a user has performed the user registration, information related to this user (user information) is registered and managed in, for example, a database included in the provider server 140. User information managed in the database may include not only identification information that uniquely identifies a user, such as a user ID, but also information of a face image of a person who is a subject related to this user.

Demand Information Generation Sequence

Also, in order to reflect the tendencies of demands for the images purchased by users in automatic shooting of the image capturing apparatus 100, purchase information of each user is also shared with the collection server 150. Similarly to the provider server 140, the collection server 150 manages pieces of information of the respective users who use the shooting sales service in a non-illustrated database. It is assumed that information managed for each user in the database of the collection server 150 includes a user ID of this user, and information of a learning result obtained through machine learning based on purchase information of this user (demand information). The demand information is generated and sequentially updated in the collection server 150 based on purchase information of the user. In the collection server 150 of the present embodiment, the facial expressions of the face of a subject included in the recorded images purchased by the user are analyzed, and learned as the facial expressions that are demanded by the user. That is to say, demand information generated by the collection server 150 is a learning result obtained by learning preferred facial expressions and a degree to which such facial expressions are desired (a purchase frequency) on a per-user basis based on purchase information. Regarding demand information, when purchase information indicating the recorded images that have been newly purchased by a corresponding user has been obtained, the demand tendencies of the user are updated together with the learning result up until the previous time.

Note that in order for demand information to be information that appropriately reflects a user's preference, it is sufficient that the demand information be used in later-described automatic shooting under the condition that purchase information related to at least a predetermined number of recorded images has been obtained for this user. That is to say, in a case where the number of the recorded images that have been purchased is small (the number of samples is small), even if demand information has been generated based on purchase information thereof, there is a possibility that the demand information does not suitably indicate the user's demand. Therefore, demand information that has been generated in relation to a user may be used under the condition that purchase information has been learned in relation to recorded images that are, in number, equal to or larger than a set number with which the demand tendencies of the user are indicated by the demand information. In this case, it is permissible to adopt a configuration in which demand information is not generated until this condition is satisfied, that is to say, demand information related to a user is not generated until at least a predetermined number of recorded images have been purchased.

Automatic Shooting Sequence

Also, in the shooting stage, the image capturing apparatus 100 performs automatic shooting by recognizing a subject to be shot included in a scene (a person associated with a user who has made a shooting request; hereinafter referred to as a target subject), without accepting an operational input related to a shooting instruction from the user. Although the image capturing apparatus 100 is placed so that it can shoot scenes, the target subject is not necessarily captured constantly within the angle of view thereof. For this reason, the automatic shooting sequence includes a search operation for performing control so that the target subject is discovered and captured within the angle of view, and a shooting determination operation for determining whether to perform automatic shooting by evaluating the state of the target subject captured within the angle of view.

Processing Related to Search Operation

Figure 4:
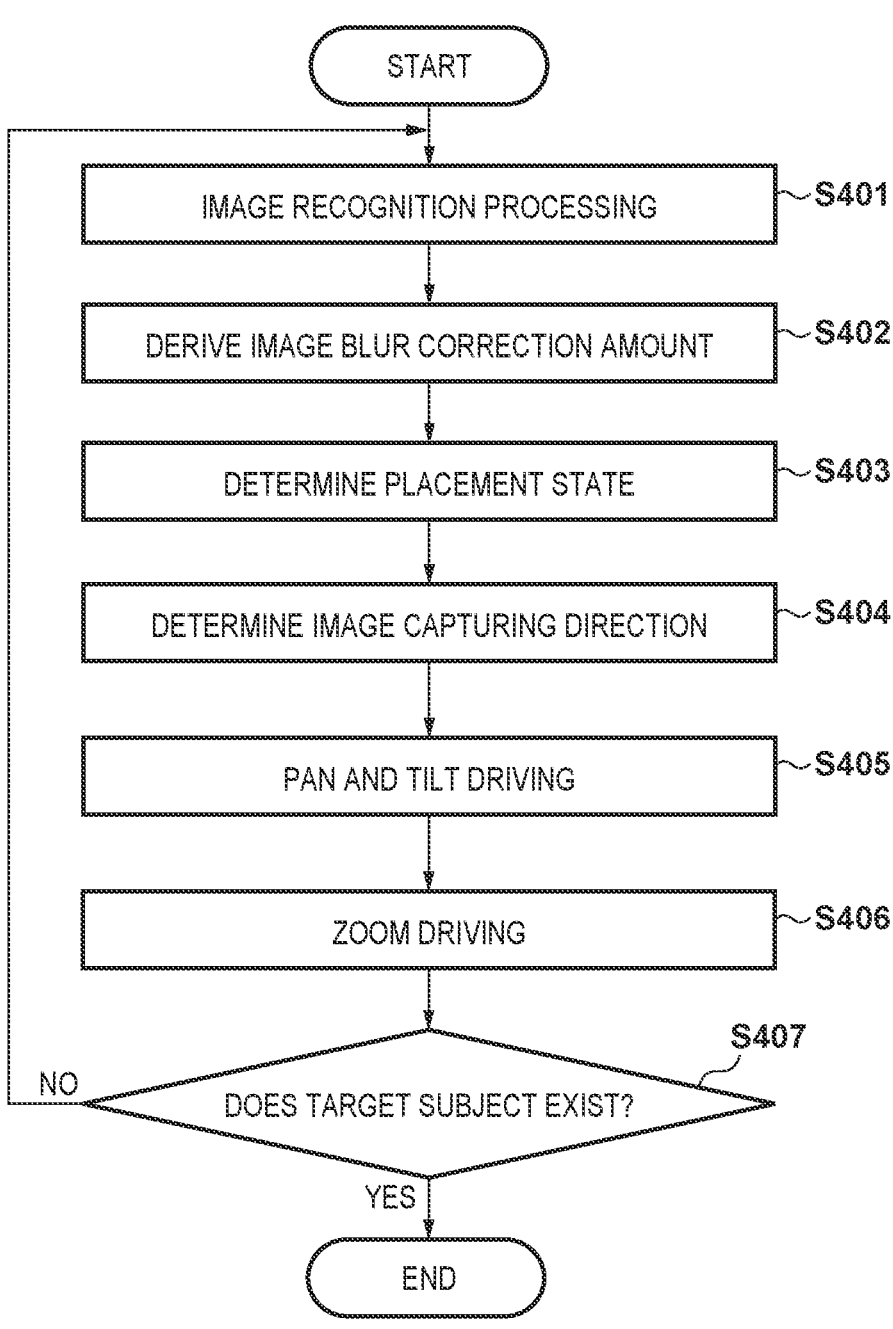
FIG. 4 is a flowchart exemplarily showing processing related to a search operation in an automatic shooting sequence according to embodiments and modification examples of the present invention.

First, an overview of the search operation of the image capturing apparatus 100 will be described with reference to a flowchart of FIG. 4. Processing corresponding to the present flowchart can be executed by the first control unit 323 reading out a corresponding processing program stored in, for example, the nonvolatile memory 316, deploying the processing program to a built-in memory, and executing the processing program. The present processing will be described as being started, for example, when it has been determined that a target subject has not been captured within the angle of view, or when the position of a target subject that has been captured within the angle of view has changed.

In step S401, under control of the first control unit 323, the recognition unit 325 obtains the status of distribution of predetermined objects in an image to be captured under the current image capturing settings. More specifically, first, the image processing unit 307 applies predetermined image processing to a captured image obtained by the image capturing unit 306, and generates an image for subject detection (hereinafter referred to as an image for detection). Then, the recognition unit 325 obtains the status of distribution by executing detection processing for detecting the images of the predetermined objects with respect to this image for detection. In the present embodiment, as the target subject is a person, the recognition unit 325 detects the images of people as the predetermined objects in the detection processing.

The detection of the images of people may be performed by detecting faces and human bodies from the image for detection. For example, in the face detection processing, with use of a pattern that has been provided in advance for specifying a face of a person, a region indicating this pattern in the image for detection is detected as a face region of a person. It is assumed that, at this time, the recognition unit 325 concurrently derives a reliability degree indicating the certainty at which the detected face region is a face. It is assumed that the reliability degree is derived based on, for example, the size of the face region in the image for detection, a degree of coincidence between the face region and a face pattern, and the like.

In step S402, the first control unit 323 derives a shake (vibration) applied to the image capturing apparatus 100 as an absolute angle based on information of the angular velocity and acceleration obtained by the shake detection unit 309. Then, the first control unit 323 derives, as an image blur correction amount, a rotation angle with which image blur correction is performed by driving the tilt rotation unit 203 and the pan rotation unit 204 in an angular direction that cancels out the derived absolute angle.

In step S403, the first control unit 323 determines the placement state of the image capturing apparatus 100. More specifically, the first control unit 323 determines the placement state based on the angular velocity information and the acceleration information obtained by the shake detection unit 309, or on the shooting direction and the moving amount of the image capturing apparatus 100 that have been obtained based on, for example, position information output from a non-illustrated GPS sensor. The placement state indicates what kind of vibration state and motion state the image capturing apparatus 100 is currently in. For example, in a case where the image capturing apparatus 100 is moving faster than a predetermined speed, it is estimated to be mounted on a moving body, such as a vehicle, and thus the first control unit 323 determines that the placement state is "a state of vehicular movement". Also, for example, in a case where the amount of change in the image capturing direction is smaller than a reference value, the first control unit 323 determines that the placement state is "a stationary shooting state" where the image capturing apparatus 100 is experiencing almost no shake. Furthermore, for example, in a case where the amount of change in the image capturing direction is larger than the reference value, it is expected that a person is holding the image capturing apparatus 100, and thus the first control unit 323 determines that the placement state is "a hand-held state". The changes in an image within the captured images that are sequentially obtained can vary depending on what kind of placement state the image capturing apparatus 100 is in; therefore, information of the placement state obtained in the present step is referenced in determining a search target area, which will be described later.

In step S404, the first control unit 323 determines the image capturing direction in which the existence of the target subject is searched for next. The determination of the image capturing direction includes the processes of "area division", "derivation of an importance level on a per-area basis", and "determination of a search target area". Each process will be described below in more detail.

(1) Area Division

Figure 5A:
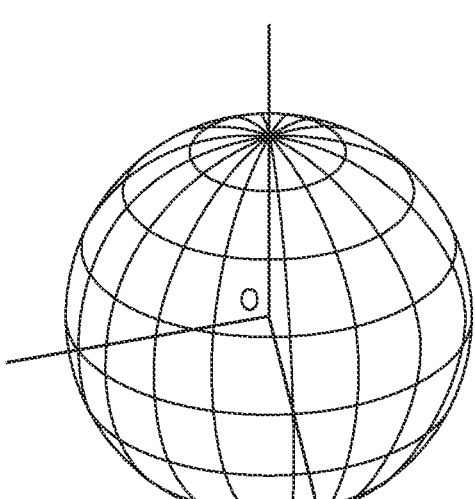
FIGS. 5A, 5B, 5C and 5D are diagrams for describing a search operation according to embodiments and modification examples of the present invention.
Figure 5B:
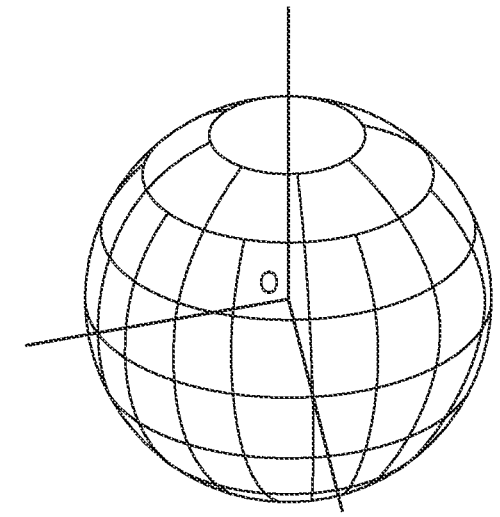

The process of area division is now described using FIG. 5A. In an example of FIG. 5A, the image capturing apparatus 100 is located at an origin O, and the entire circumference centered at the image capturing apparatus 100 has been divided into areas. In the example of FIG. 5A, the division has been performed in units of 22.5 degrees in each of the tilt direction and the pan direction. Meanwhile, in a mode in which the division is performed as in FIG. 5A, the circumferential distance in the horizontal direction become shorter and the divided areas become smaller as the angle in the tilt direction departs from 0 degrees. For this reason, as shown in FIG. 5B, with regard to regions in which the tilt angle is 45 degrees or more, the divided areas are set to have a width larger than 22.5 degrees in the horizontal direction (pan direction).

Figure 5C:
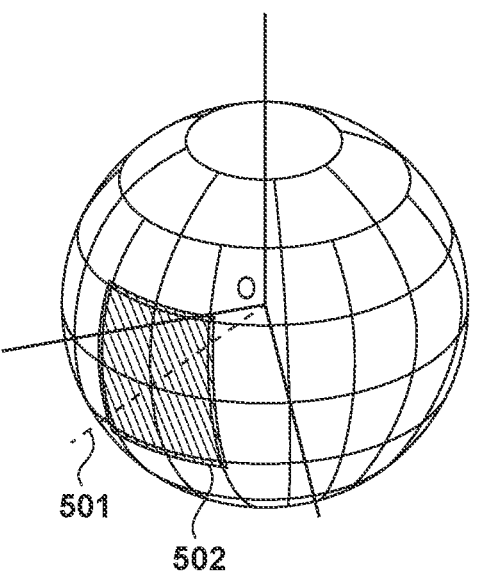
Figure 5D:
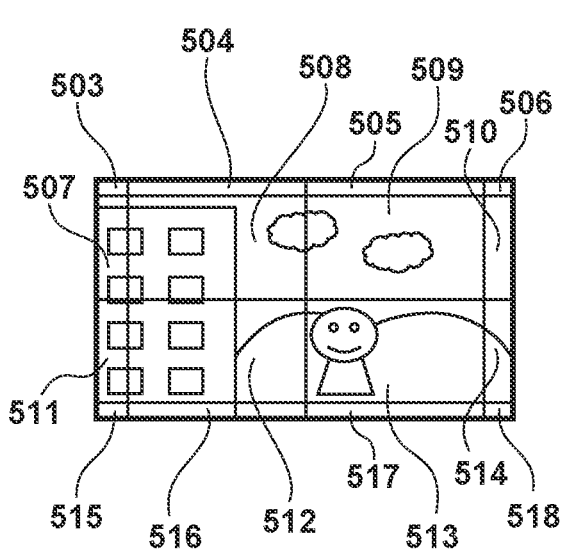

FIGS. 5C and 5D show examples of a region that has been divided into areas within the angle of view pertaining to image capture. In FIG. 5C, an axis 501 is the direction of the image capturing apparatus 100 in an initialized state, and the area division is performed using this direction as a reference position. An area 502 denotes an area that has been captured within the angle of view pertaining to image capture performed in the initialized state, and FIG. 5D exemplarily shows a captured image that is captured in this case. As shown in the figure, regions 503 to 518 in the captured image correspond to different divided areas, respectively.

(2) Derivation of Importance Level on Per-Area Basis

Subsequently, with respect to each of the areas that have been divided in the foregoing manner, the first control unit 323 derives an importance level indicating a priority order in which the search is performed in accordance with the status of a subject (person) that exists in the area. The importance level based on the status of the subject is derived based on, for example, the number of people who exist inside the area, the sizes of the faces of the people, the directions of the faces, the certainties of face detection, the facial expressions of the people, the results of individual recognition of the people, and the like. In deriving the importance level of each area, the importance level may be further adjusted based on the placement state of the image capturing apparatus 100 determined in step S403.

Note that although the present embodiment is described in relation to a mode in which the importance level of each area is derived based on information related to a person because the target subject is a person, the importance level may be derived based on other information. The importance level may be derived in accordance with, for example, the status of the scene; for example, the result of recognition of an object in the scene, the result of scene distinction (a blue sky, a backlight, a nightscape, or the like), the level of a sound that has been made from the direction of the area, the result of sound recognition, information of detection of a motion inside the area, and the like can be used in the derivation.

Furthermore, there is a possibility that the area with the highest importance level remains the same if only the foregoing conditions are used unless the areas undergo a change, and consequently, the search target area does not change; for this reason, the importance level may be adjusted in accordance with past shooting information. Specifically, the first control unit 323 may lower the importance level of an area that has been continuously designated as the search target importance level for a predetermined uninterrupted period, or lower the importance level of an area corresponding to the direction in which shooting has been performed within a predetermined period.

(3) Determination on Search Target Area

The first control unit 323 determines the search target area based on the importance levels that have been derived for the respective areas. It is sufficient that the first control unit 323 determine, for example, an area with the highest importance level obtained in the step (2) as the search target area.

Once the search target area has been determined in this way, the first control unit 323 determines the image capturing direction of the image capturing apparatus 100 for capturing this area within the angle of view, and derives the pan and tilt angles that are necessary to orient the lens barrel 201 in this image capturing direction (hereinafter referred to as a search target angle).

In step S405, the first control unit 323 executes pan and tilt driving associated with the change in the image capturing direction. More specifically, the first control unit 323 derives an amount of pan and tilt driving by adding the image shake correction amount at a control sampling frequency derived in step S402 and a driving angle based on the search target angle derived in step S404. Then, the first control unit 323 causes the rotational driving unit 305 to control driving of the tilt rotation unit 203 and the pan rotation unit 204 using the derived amount of pan and tilt driving.

In step S406, the first control unit 323 executes zoom driving associated with a change in a zoom factor. More specifically, the first control unit 323 determines a zoom factor to be applied to the zoom unit 301 in accordance with the sizes of face regions that are distributed in the search target area determined in step S404. In the present embodiment, as a face region corresponding to the target subject is recognized and automatic shooting is controlled based on the facial expression of this target subject, it is necessary that a face region included in the search target area be captured at a size that enables face recognition in the later-described shooting determination operation. That is to say, if the size of a face region is too small in a captured image for which the shooting determination is to be made (hereinafter referred to as an image for determination), whether a person related to this face region is the target subject cannot be determined. Therefore, in a case where a face region included in the search target area falls below the minimum size to which the face recognition processing can be applied, the first control unit 323 changes the zoom factor toward the telephoto end, and performs zoom driving so that the image for determination is obtained in a state where the size of this face region has been increased. On the other hand, if the size of a face region included in the search target area is too large, there is a possibility that this face region does not fit within the angle of view in the image for determination in a case where a subject or the image capturing apparatus 100 has moved thereafter before the timing of image capture of the image for determination. Therefore, in a case where a face region included in the search target area exceeds a predetermined size, the first control unit 323 changes the zoom factor toward the wide angle end, and performs zoom driving with respect to the image for determination in a state where the size of this face region has been reduced. In this way, the success rate of the face recognition processing for the image for determination can be increased, and furthermore, appropriate angle-of-view control can be realized also in a case where, for example, shooting is performed while tracking a specific subject.

In step S407, the first control unit 323 determines whether the target subject exists in the scene. This determination is made as a result of the recognition unit 325 executing the face recognition processing using the captured image that has been captured in accordance with the image capturing direction and the zoom factor that have been changed in steps S405 and S406 (the image for determination). More specifically, similarly to step S401, the recognition unit 325 detects face regions with respect to the image for determination, executes the face recognition processing with respect to each of the detected face regions, and determines whether each of the detected face regions is a face region of the target subject. With regard to the face recognition of the target subject, a face image of the target subject associated with the user who has made the shooting request is obtained from the provider server 140, and the face recognition is performed using this face image. In a case where it is determined that the face region of the target subject is included in the image for determination as a result of the face recognition processing, the first control unit 323 determines that the target subject exists in the scene, and ends processing related to the present search operation. Furthermore, in a case where it is determined that the target subject does not exist in the scene, the first control unit 323 causes processing to return to step S401, and repeats the search operation.

Processing Related to Shooting Determination

In a case where it is determined that the target subject exists in the scene in processing related to the above-described search operation, the first control unit 323 executes processing related to the shooting determination.

Basically, an evaluation value indicating a degree of appropriateness for shooting is derived based on the state of the image of the target subject that appears in the image for determination, and whether or not to perform shooting is determined based on whether this evaluation value exceeds a shooting threshold that is set based on a shooting condition. The evaluation value is derived based on, for example, information of the results of face detection and the results of individual recognition related to the image for determination, the degrees to which subjects, including the target subject, are closing their eyes, the facial expressions of the faces, the directions of the faces, the image sizes, and the like.

Meanwhile, if automatic shooting is performed under the condition that the evaluation value of the captured image (the image for determination) exceeds the shooting threshold, many similar images are recorded as stated earlier, and therefore a predetermined wait period is normally set from when shooting has been performed to when the next shooting can be performed. That is to say, in a case where an evaluation value that exceeds the shooting threshold is easily derived when, for example, the facial expression is a smile, automatic shooting is performed continuously if the target subject keeps smiling, and a large number of images with similar contents are recorded; for this reason, control is performed so as to reduce the frequency at which automatic shooting is performed under similar conditions.

FIG. 6A illustrates a graph showing a transition in the evaluation values that are derived with respect to images for determination that are sequentially obtained, and the timings at which automatic shooting is performed. In the graph, a horizontal axis represents a period that has elapsed (time), and a vertical axis represents an evaluation value that has been derived with respect to an image for determination. The height of one bar that extends vertically in the graph indicates an evaluation value that has been derived with respect to an image for determination that has been obtained in related to specific time. In the figure, a shooting threshold 601 is shown, and the bars at respective times, which are distributed in the graph, are distinguished by modes associated with their relationships with this shooting threshold 601. Specifically, the bars filled with black represent times at which the evaluation value does not exceed the shooting threshold 601, whereas the bars filled with white represent times at which shooting is performed as the evaluation value exceeds the shooting threshold 601. Furthermore, the bars with hatching represent times at which the evaluation value exceeds the shooting threshold 601, but shooting is not performed because the times fall in the wait period.

In the example of FIG. 6A, a period threshold related to the wait period, in which shooting is not performed, is set at 10 seconds; at times 603 to 606 at which a period that has elapsed since time 602 of the execution of the first shooting does not exceed the period threshold, the evaluation value exceeds the shooting threshold 601, but shooting is not performed. On the other hand, at time 607 at which the evaluation value exceeds the shooting threshold 601 after a period that has elapsed since time 602 exceeds the period threshold, shooting is performed. That is to say, control is performed so that, by setting the wait period, many unnecessary sessions of shooting are not performed from time 602 to time 606.

On the other hand, with a normal method in which the foregoing wait period is set, there is a possibility that automatic shooting is not performed at the timing at which the evaluation value becomes the highest. In the example of FIG. 6A, although the evaluation value becomes the highest at time 605, shooting is not performed at this time, which falls in the wait period, because shooting was performed at time 602. That is to say, with the foregoing setting where a fixed wait period is provided, there is a possibility that an image with a high evaluation value, which is supposedly desired by the user, is not recorded, thereby diminishing the willingness of the user to purchase.

For this reason, the image capturing apparatus 100 of the present embodiment performs control so that, by changing the wait period dynamically based on demand information related to the user who has made the shooting request, the shooting frequency is increased in a case where the state of the target subject is a state that is highly demanded by the user. More specifically, the first control unit 323 performs control so that, by changing the wait period to be shorter than normal in a case where the target subject shows a state that is highly demanded by the user based on the demand information, the number of recorded images is increased with respect to the target subject in this state.

The collection server 150 of the present embodiment specifies, from the recorded images purchased by the user, the facial expressions of the target subject that appears in these recorded images, and generates demand information by learning the extents to which the user has purchased the recorded images showing the respective facial expressions by preference. For example, the demand information includes, as a learning result, demand tendencies indicating that 78% of the recorded images purchased by the user include a smile as the facial expression of the target subject, 17% include a serious face, and 5% include a crying face. That is to say, the demand information of the present embodiment includes information of the type of the facial expression that is more preferred by the user (that the user desires to purchase), and the percentages of the images showing the respective facial expressions in the images purchased by the user. That is to say, with regard to the percentage of the images showing a specific facial expression in the images purchased by the user, a higher percentage indicates a higher demand (degree of preference) by this user. Below, the percentage of the images showing a specific facial expression in the images purchased by the user may also be simply referred to as a degree of demand for this facial expression.

A description is now given of control on the change of the wait period and the frequency of automatic shooting in relation to a mode in which the evaluation value is derived as shown in FIG. 6B in a case where the target subject has a smiling face. Note that FIG. 6B shows a temporal change in the evaluation value similar to that of FIG. 6A. In a case where demand information related to a user indicates that a degree of demand for a smiling face is 78% as described earlier, this user prefers that the shooting frequency be high when the target subject has a smiling face. Therefore, after the first control unit 323 has caused shooting to be performed at time 602 with respect to a state where the target subject has a smiling face, it sets the wait period at a period shorter than 10 seconds.

The wait period set here is shortened in accordance with the degrees of demand for the respective facial expressions, so that the shooting frequency increases for the facial expression that is highly demanded by the user. In the present embodiment, the first control unit 323 derives a period obtained by multiplying the normal wait period (10 seconds) by the degree of demand for the smiling face, namely 78% (10×0.78=7.8 seconds) as a reduction period. As a result, in a case where shooting has been performed as the evaluation value has exceeded the shooting threshold with respect to the target subject with a smiling face, the wait period that is set until the state of a smiling face is similarly shot again is 10−7.8=2.2 seconds. In the example of FIG. 6B, as the wait period is reduced to 2.2 seconds, it is determined that shooting is to be performed at time 605 after the target subject with a smiling face has been shot at time 602. That is to say, the shooting frequency of the target subject with a smiling face, which is highly demanded by the user, is increased; as a result, the possibility that shooting is performed at a timing of a high evaluation value can be heightened as in the example of FIG. 6B.

Note that although control on the shooting determination has been described with reference to FIGS. 6A and 6B using an example of an evaluation value that is derived in a case where the target subject has a smiling face, control may be similarly performed also with respect to other facial expressions. That is to say, it is sufficient that a wait period that is set in relation to the same facial expression be adjusted to a value that has been reduced in accordance with the degree of demand for this facial expression related to the user. That is to say, with regard to a facial expression that is indicated by demand information related to the user to be in demand, a value shorter than the wait period that is normally set (10 seconds) is set. It is assumed in this case that, when shooting has been performed with respect to any facial expression, the wait period that is set in relation to this facial expression is not referenced in the shooting determination for a later case where the target subject has changed their facial expression. In other words, the wait periods are set respectively for the facial expressions of the target subject that have been shot, and change the shooting frequency of the same facial expression in accordance with the demand tendencies of the user.

Furthermore, the present invention is not limited to being embodied in the foregoing mode; the set wait period may simply determine a period until the next shooting can be performed after one session of shooting has been performed, without limiting the facial expression of the target subject. That is to say, the wait period may be a period which is set based on the facial expression of the target subject during the most recent shooting, but which is applied thereafter without the target subject having the same facial expression. For example, in a case where the target subject had a smiling face during the most recent shooting, a wait period of 2.2 seconds is set; in a case where a period that has elapsed since the most recent shooting has exceeded 2.2 seconds, even if the facial expression of the target subject is not a smiling face, shooting is performed under the condition that the evaluation value has exceeded the shooting threshold.

Figure 7:
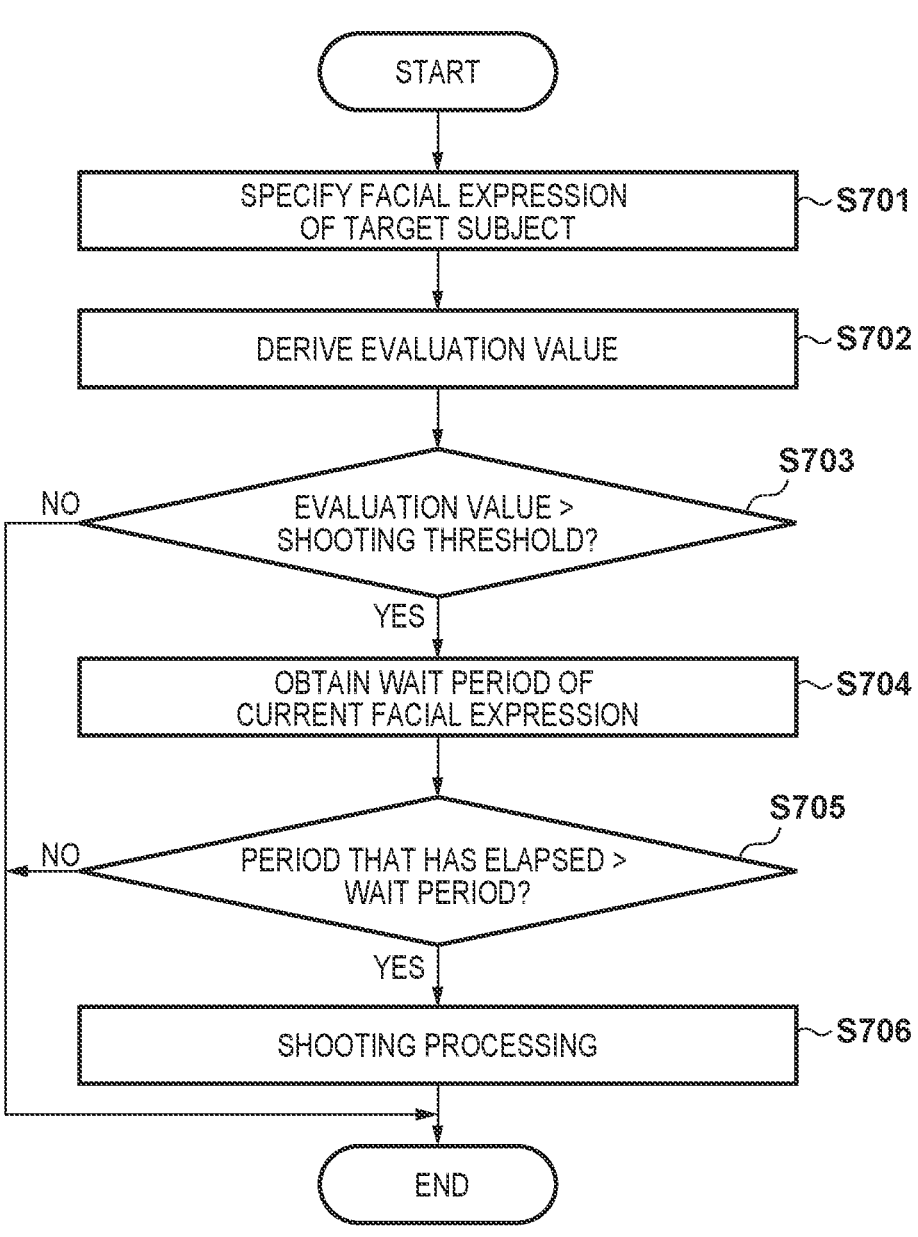
FIG. 7 is a flowchart exemplarily showing processing related to shooting determination in an automatic shooting sequence according to the first embodiment of the present invention.

The following describes the details of the shooting determination operation described above, with reference to a flowchart of FIG. 7. Processing corresponding to the present flowchart can be executed by the first control unit 323 reading out a corresponding processing program stored in, for example, the nonvolatile memory 316, deploying the processing program to a built-in memory, and executing the processing program. The present processing will be described as being started when, for example, an image for determination has been captured after it has been determined that a target subject exists in the scene through the execution of processing related to the search operation. Furthermore, it is assumed that, prior to the execution of the present processing, demand information related to a user who has made the shooting request and information of a face image of the target subject have been obtained. Note that in order to facilitate the understanding of the invention, the present embodiment will be described under the assumption that shooting performed by the image capturing apparatus 100 is shooting of still images. However, the present invention is not limited to being embodied in this way, and may be used in determining whether to perform a different type of shooting, such as shooting of moving images and continuous shooting.

In step S701, under control of the first control unit 323, the recognition unit 325 specifies a facial expression of a target subject based on an image for determination.

In step S702, the first control unit 323 derives an evaluation value of the image for determination. In deriving the evaluation value, information of the results of face detection and the results of face recognition related to the image for determination, the facial expression of the target subject, and the like may be referenced.

In step S703, the first control unit 323 determines whether the evaluation value of the image for determination exceeds a shooting threshold. Shooting thresholds may be, for example, provided respectively for the facial expressions of the target subject, and are set in advance by the setting unit 326. In a case where the first control unit 323 has determined that the evaluation value of the image for determination exceeds the shooting threshold, processing proceeds to step S704; in a case where it has determined that the evaluation value does not exceed the shooting threshold, the present processing is completed without performing shooting.

In step S704, the first control unit 323 obtains a wait period related to the facial expression specified in step S701 (the current facial expression of the target subject). In the present embodiment, it is assumed that the wait period related to the current facial expression of the target subject is derived by the first control unit 323 based on the degree of demand for this facial expression included in the demand information of the user. For example, in a case where the current facial expression of the target subject is a smiling face and the degree of demand for the smiling face in the demand information is 78% as described above, a wait period of 2.2 seconds is derived as a result of subtracting 7.8 seconds corresponding to this 78% from a fixed wait period of 10 seconds. Furthermore, in a case where the demand information does not include information of the degree of demand for the current facial expression of the target subject (there is no demand therefor), this wait period is set at 10 seconds, namely the fixed wait period. Note that the wait period need not be derived each time the present step is executed; for example, in a case where updated demand information has been received, the first control unit 323 may derive the wait period and store the same into a memory and the like in advance, and the stored wait period may be referenced.

In step S705, the first control unit 323 determines whether a period that has elapsed since previous shooting that was performed with respect to the current facial expression of the target subject exceeds the wait period related to this facial expression. In a case where the period that has elapsed since the previous shooting that was performed with respect to the current facial expression of the target subject exceeds the wait period related to this facial expression, the first control unit 323 causes processing to proceed to step S706; in a case where the period does not exceed the wait period, the present processing is completed without performing shooting.

In step S706, the first control unit 323 executes shooting processing in which the image capturing unit 306 performs the shooting operation and an obtained image is recorded as a recorded image, and the present processing is completed. The recorded image may be recorded inside the image capturing apparatus 100, such as the nonvolatile memory 316 and the recording medium 321, or may be transmitted to and hence recorded into the data server 130 via the communication unit 322.

As described above, the control apparatus of the present embodiment can realize automatic shooting with which a subject in a state desired by a user is easily recorded. More specifically, the control apparatus evaluates the state of a target subject with respect to an image for determination, obtains an evaluation value related to the facial expression of the target subject and the target subject as a result of evaluation, and determines whether to shoot the target subject. The control apparatus changes a wait period until the next shooting can be performed in accordance with the magnitudes of demands for respective facial expressions, based on the tendency of demand for the facial expression of the target subject desired by the user, which has been learned based on the history of purchase of recorded images by the user. At this time, the frequency of shooting that is performed in a case where the target subject has a facial expression that is highly demanded by the user can be increased by making a wait period set for the facial expression that is highly demanded by the user shorter than the period set for a facial expression that is in low demand. As a result, in a service that sells recorded images that have been recorded through automatic shooting, the user easily attains images in a suitable state that matches their preference. In other words, due to the foregoing control on the shooting frequency based on the demand tendencies of the user, the user is less likely to miss the attainment of images of their preference; this makes it easy for the user to attain images of their preference without performing shooting with the image capturing apparatus 100 on their own. Furthermore, from the viewpoint of the service provider, there is an increased possibility that the user will purchase recorded images, and an increase in the profits is expected.

Note that although the present embodiment has been described under the assumption that a target subject is, for example, a user him/herself who has made the shooting request, or a person associated with the user, such as a family member or an acquaintance of the user, it is to be easily understood that the present invention is not limited to being embodied in this way. The present invention does not require that the target subject be a person; for example, any type of object, such as an animal like a dog or a cat, and another entity, may also be used as a subject. That is to say, the present invention is applicable as long as a state type, such as a facial expression and a pose, is specified with respect to a target subject, and the shooting frequency in automatic shooting is changed based on the demand tendency of a user with respect to this state type. Therefore, the demand tendencies of the user are not limited to being learned with respect to facial expressions of a person, and may be learned with respect to state types that are adaptively set in accordance with the type of an object selected as the target subject.

Furthermore, although the present embodiment has been described under the assumption that subjects are detected using a method that specifies regions that match a preset image pattern, the present invention is not limited to being embodied in this way. The detection of subjects may incorporate another method, such as a method of extracting feature subjects using a histogram of hue, saturation, or the like in a captured image. The method of extracting feature subjects executes processing in which, with regard to the images of subjects that have been captured within the angle of view pertaining to shooting, a distribution derived from this histogram of hue, saturation, or the like is divided into a plurality of sections, and a captured image is classified on a per-section basis. For example, a histogram of a plurality of color components is generated with respect to the captured image, a mountain-shaped distribution range therein is divided, the captured image is classified based on regions that belong to a combination of the same sections, and regions that show the images of the subjects are specified. In this case, the recognition unit 325 can also derive the evaluation values respectively for the specified regions of the subjects, and specify a region with the largest evaluation value thereamong as a main subject region.

Furthermore, the present embodiment has been described under the assumption that an image for determination is captured under the condition that a target subject exists in the scene in processing related to the search operation in the automatic shooting sequence, and processing related to the shooting determination is executed; however, the present invention is not limited to being embodied in this way. Automatic shooting of the image capturing apparatus 100 need not be performed only with respect to a specific target subject; for example, as long as the state of the image of a person among detected people satisfies the shooting condition, the automatic shooting may be performed even if this person is not a target subject. That is to say, an image for determination is not obtained under the condition that a target subject has been detected. In this case, it is sufficient that the first control unit 323 recognize, for example, a person included in the image for determination, specify a user with which this person is associated, obtain demand information related to this user, and make the shooting determination.

First Modification Example

The above embodiment has been described in relation to a mode in which the wait periods that are in conformity with demand information are set as the period thresholds respectively for the facial expressions of a target subject, and shooting is performed in a case where a period that has elapsed since previous shooting that was performed with respect to a facial expression of the target subject when the shooting condition was satisfied exceeds a period threshold. However, the present invention is not limited to being embodied in this way, and may adopt a mode in which, in determining whether to perform shooting, a threshold for a period that should elapse since the shooting that has been performed most recently is determined in accordance with the current facial expression of the target subject. That is to say, each time the evaluation value of the image for determination exceeds the shooting threshold, a period threshold corresponding to a demand tendency may be determined based on the facial expression of the target subject in this image for determination, and the shooting determination may be made based on a period that has elapsed, irrespective of the facial expression of the target subject in the recorded image that has been recorded most recently.

In this mode, processing related to the shooting determination may be executed as in, for example, a flowchart of FIG. 8. Note that in the description of processing related to the shooting determination according to the present modification example, steps that perform operations similar to those of the same processing according to the first embodiment are given the same reference numerals thereas, and a description thereof is omitted; below, only steps that execute processing unique to the present modification example will be described.

In a case where it has been determined that the evaluation value of the image for determination exceeds the shooting threshold in step S703, the first control unit 323 obtains a period threshold related to the current facial expression of the target subject, that is to say, a threshold for a period that should elapse since the shooting that has been performed most recently, in step S801. It is assumed in the present modification example that the first control unit 323 derives the period threshold each time based on the degree of demand for the current facial expression of the target subject, using a method similar to that of step S704. However, the present invention is not limited to being embodied in this way; the period threshold may be obtained by referencing information of the period threshold that has been derived in advance based on demand information.

In step S802, the first control unit 323 determines whether a period that has elapsed since the most recent shooting exceeds the period threshold obtained in step S801. In a case where the period that has elapsed since the most recent shooting exceeds the period threshold related to the current facial expression of the target subject, the first control unit 323 causes processing to proceed to step S706; in a case where the period does not exceed the period threshold, the present processing is completed without performing shooting.

This makes it possible to realize automatic shooting with which images that show a subject in a state desired by the user are easily recorded. More specifically, as a period threshold that should elapse since the shooting that has been performed most recently is set in accordance with the degree of demand for the facial expression of the target subject in the image for determination, the shooting frequency can be controlled in accordance with the magnitude of the demand.

Second Embodiment

The above embodiment and modification example have been described in relation to a mode in which, when an evaluation value of an image for determination has exceeded the shooting threshold, automatic shooting is performed under the condition that a period that has been set in accordance with a degree of demand for a facial expression of a target subject has elapsed since the shooting that has been performed earlier. However, the determination about whether to perform automatic shooting is not limited to this. It is also possible to set an interval between sessions of automatic shooting and avoid redundant recording of similar images by, for example, temporarily increasing the shooting threshold after one session of shooting has been performed, without providing a period threshold in which shooting is not performed, such as a wait period. In this case, it is sufficient to change the shooting threshold with time in response to shooting as shown in, for example, FIG. 9A. In FIG. 9A, a horizontal axis represents a period that has elapsed, and a vertical axis represents a shooting threshold.

In the example shown, the shooting threshold fluctuates linearly; it is changed to a value $T_{MAX}$ by being increased by a predetermined value (e.g., 100) when automatic shooting has been executed, and then returns to the normal shooting threshold $T_{ST}$ when a certain period has elapsed after the shooting. In this way, similarly to the first embodiment, after one session of shooting has been performed, the shooting threshold has a high value compared to before the shooting, that is to say, compared to a normal case, and thus automatic shooting is not likely to be performed. That is to say, there is a possibility that, even if a target subject is in a state of the user's preference, the next shooting is not performed until the certain period elapses, similarly to the first embodiment. Note that in the example of the figure, control is performed so that, after the shooting threshold that has been increased due to the automatic shooting has returned to the normal value, if the shooting is not further performed for a predetermined period, the shooting threshold is further reduced to a value T MIN before a predetermined period ends so that the shooting is easily performed.

The present embodiment will be described in relation to a method of increasing the shooting frequency of a target subject in a state that matches the user's preference in a mode configured to reduce the shooting frequency in automatic shooting by causing the shooting threshold to fluctuate in the foregoing manner. In an example described below, it is assumed that demand information indicates a learning result whereby 78% of the recorded images purchased by a user include a smile as a facial expression of a target subject, 17% include a serious face, and 5% include a crying face, and that the target subject has a smiling face. In this case, a temporal transition in the shooting threshold is as shown in FIG. 9B, for example.

In an example of FIG. 9B, the shooting threshold is increased to $T_{MAX}$ when automatic shooting has been performed, and then gradually decreases, similarly to FIG. 9A; however, in a period 901 in which the facial expression of the target subject is a smiling face, the shooting threshold is uniformly reduced by a fixed value as indicated by a bold line. That is to say, although the first control unit 323 performs control so that the shooting threshold returns from $T_{MAX}$ to the normal value in sequence when automatic shooting has been performed, in a case where the facial expression of the target subject is a smiling face for which a degree of demand has been set in the demand information, the shooting threshold is set at a value obtained by subtracting the fixed value from the shooting threshold. The fixed value that is subtracted in this case (a subtraction value) varies depending on the degree of demand for the facial expression of the detected target subject, so that automatic shooting is easily performed with respect to a facial expression that is in high demand. For example, in the case of a smiling face, the first control unit 323 devices, as the subtraction value, a value obtained by multiplying the increased value of 100 immediately after the shooting by the degree of demand for the smiling face, namely 78% (100× 0.78=78). As a result, a value obtained by subtracting 78 from the value that has been increased due to the shooting, is set as the shooting threshold used in the shooting determination for a target subject with a smiling face.

It goes without saying that the foregoing control for causing the fluctuation of the shooting threshold to vary, is similarly applicable to other facial expressions (a serious face and a crying face) for which the degrees of demand have been set by the demand information.

As described above, according to the image capturing apparatus 100 of the present embodiment, a period until the shooting threshold returns to the normal value is reduced depending on the degree of demand, and the shooting frequency can be increased in a case the target subject has a facial expression of the user's preference. That is to say, the probability that the recorded images that match the user's preference are recorded can be increased, and it is less likely that shooting is missed in a case where the target subject is in a state desired by the user.

Note that although the present embodiment has been described under the assumption that the shooting threshold is derived by subtracting a fixed value corresponding to the degree of demand for the facial expression of the detected target subject from a value that has been set in accordance with time attenuation based on $T_{ST}+T_{MAX}$, the present invention is not limited to being embodied in this way. For example, a period required for the return to $T_{ST}$ may be reduced by changing $T_{MAX}$ itself ($T'_{MAX}$) in accordance with the degree of demand for the facial expression of the target subject, as indicated by a bold line in FIG. 9C.

Second Modification Example

The above embodiments and modification example have been described under the assumption that an evaluation value is derived using the same derivation method in any mode; however, for example, in a case where a facial expression for which a degree of demand has been set in demand information has been detected, the evaluation value may be derived by adding thereto a value corresponding to the degree of demand. In this way, the shooting frequency can be further increased in a case where a target subject has a facial expression that is demanded by a user.

Third Modification Example

Although the above embodiments and modification examples have been described in relation to a mode in which a period threshold and a shooting threshold are set at the values corresponding to the degree of demand for a facial expression of a target subject set in demand information, the present invention is not limited to being embodied in this way. That is to say, although the above embodiments and modification examples have been described in relation to a mode in which control is performed so that the shooting frequency increases in proportion to the magnitude of the degree of demand for a facial expression of a target subject, the present invention is not limited to being embodied in this way. It is sufficient that the present invention perform control so that the shooting frequency increases for a facial expression for which a high degree of demand has been set in the demand information compared to a facial expression for which a lower degree of demand has been set, and the extent of the shooting frequency need not be set in proportion to the degree of demand. Furthermore, in this case, the same shooting frequency may be set with respect to facial expressions with two different degrees of demand that fall in a predetermined range.

Fourth Modification Example

Although the above embodiments and modification examples have been described under the assumption that demand information of each user is configured as a result of the collection server 150 performing machine learning based on purchase information of this user, the present invention is not limited to being embodied in this way. That is to say, the demand information need not be configured as a learning result of machine learning, and may be, for example, statistical data which is based on purchase information and which is configured in the form of a lookup table or the like.

Fifth Modification Example

Furthermore, although the above embodiments and modification examples have been described under the assumption that demand information of an individual is configured as demand tendencies of a user based on pieces of purchase information of respective users, the present invention is not limited to being embodied in this way. Demand information may be, for example, configured based on pieces of purchase information of one or more users who are categorized as an arbitrary set, such as a class, a grade, a school, a school district, or the like to which pupils who act as subjects belong. For example, pieces of demand information are configured as the demand tendencies of the entire guardians of pupils who go to an arbitrary school as a result of performing automatic shooting with respect to subjects, namely a plurality of pupils, at an event held at the school, and by performing learning later based on the recorded images purchased by the guardians. In this case, at an event that is held at this school thereafter, the pieces of demand information associated with the entire guardians are transmitted to the image capturing apparatus 100 and referenced in automatic shooting during the event; as a result, a large number of recorded images that are averagely desired by a plurality of users (guardians) can be recorded. Note that in this case, as pieces of demand information to be referenced in the shooting determination can be specified on a per-event basis, each user need not be necessarily identified in the shooting stage.

Sixth Modification Example

Furthermore, although the above embodiments and modification examples have been described under the assumption that the image capturing apparatus 100 obtains demand information and controls the shooting frequency based on the demand information in the shooting determination, the present invention is not limited to being embodied in this way. The control on the operations related to automatic shooting of the image capturing apparatus 100 may be performed in, for example, an external control apparatus (e.g., the communication terminal 110) that is connected to the image capturing apparatus 100 in a communication-enabled manner. In this mode, whether or not to perform shooting is determined based on demand information in the control apparatus, and in a case where it has been determined that the shooting is to be performed, the operations of the image capturing apparatus 100 are controlled based on the determination result.

Seventh Modification Example

Furthermore, although the above embodiments and modification examples have been described under the assumption that recorded images are provided to a user in the form of sales, the present invention is not limited to being embodied in this way. Recorded images may be provided to a user in any form that does not involve a monetary payment. Furthermore, the demand tendencies of users may be analyzed by collecting arbitrary information, such as input information related to evaluations indicating the users' preferences, the number of views, and the number of likes that have been registered, which have been obtained for each image, and may be reflected in demand information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-100417, filed Jun. 22, 2022 which is hereby incorporated by reference herein in its entirety.

What is claimed is:

1. A control apparatus that controls an image capturing apparatus that obtains, through automatic shooting, an image to be provided to a user, the control apparatus comprising:
    at least one processor and/or circuit; and
    at least one memory storing computer program, which causes the at least one processor and/or circuit to function as the following units:
    an evaluation unit configured to evaluate a state of a subject;
    a determination unit configured to, based on a result of the evaluation made by the evaluation unit, determine whether to cause the image capturing apparatus to perform shooting;
    an obtainment unit configured to obtain, from a demand database, demand information that indicates demand tendencies of a user respectively for state types of the subject; and
    a control unit configured to control an operation of the determination unit based on the demand information obtained by the obtainment unit,
    wherein the control unit controls the operation of the determination unit so that a frequency at which the image capturing apparatus performs shooting varies in accordance with magnitudes of demands for the respective state types of the subject.

2. The control apparatus according to claim 1, wherein the control unit controls the operation of the determination unit so that the frequency at which the image capturing apparatus performs shooting increases as a demand for a state type of a subject increases.

3. The control apparatus according to claim 1, wherein the control unit controls the operation of the determination unit so that the frequency at which the image capturing apparatus performs shooting is higher in a case where a degree of demand for a state type of a subject is a first degree of demand than in a case where the degree of demand is a second degree of demand that represents a lower demand than the first degree of demand.

4. The control apparatus according to claim 2, wherein the result of the evaluation includes information that specifies a state type of a subject,
    the determination unit determines to cause the image capturing apparatus to perform shooting under a condition that a period that has elapsed since previous shooting performed by the image capturing apparatus with respect to a state type that is the same as the state type of the subject specified by the result of the evaluation exceeds a preset period threshold, and
    the control unit changes the frequency at which the image capturing apparatus performs shooting by changing the period threshold in accordance with a magnitude of a demand for the state type of the subject specified by the result of the evaluation.

5. The control apparatus according to claim 2, wherein the result of the evaluation includes information that specifies a state type of a subject,
    the determination unit determines to cause the image capturing apparatus to perform shooting under a condition that a period that has elapsed since most recent shooting performed by the image capturing apparatus exceeds a preset period threshold, and
    the control unit changes the frequency at which the image capturing apparatus performs shooting by changing the period threshold in accordance with a magnitude of a demand for the state type of the subject specified by the result of the evaluation.

6. The control apparatus according to claim 2, wherein the result of the evaluation includes information that specifies a state type of a subject, and an evaluation value obtained by evaluating a degree of appropriateness of a state of a subject for shooting,
    the determination unit determines to cause the image capturing apparatus to perform shooting under a condition that the evaluation value exceeds a shooting threshold,
    in a case where shooting has been performed, for a predetermined period after the shooting, the shooting threshold is set by increasing the shooting threshold to a value that is higher than a value thereof before the shooting, and
    the control unit changes the frequency at which the image capturing apparatus performs shooting by changing the shooting threshold in the predetermined period after the shooting in accordance with a magnitude of a demand for the state type of the subject specified by the result of the evaluation.

7. The control apparatus according to claim 2, wherein the result of the evaluation includes information that specifies a state type of a subject, and an evaluation value obtained by evaluating a degree of appropriateness of a state of a subject for shooting,
    the determination unit determines to cause the image capturing apparatus to perform shooting under a condition that the evaluation value exceeds a predetermined shooting threshold, and
    the control unit changes the frequency at which the image capturing apparatus performs shooting by increasing the evaluation value in accordance with a magnitude of a demand for the state type of the subject specified by the result of the evaluation.

8. The control apparatus according to claim 1, wherein an image is provided to a user in a form of sales of the image, and
    the demand information is information that has been configured based on a state type of a subject in an image purchased by the user.

9. The control apparatus according to claim 8, wherein the demand information is a result of learning, through machine learning, of a tendency of demand for the state type of the subject based on the image purchased by the user.

10. The control apparatus according to claim 1, wherein the demand information is information that has been configured based on a state type of a subject in a plurality of images that have been determined to be in high demand based on operations performed by a plurality of users among a plurality of images that have been shot at a predetermined event.

11. The control apparatus according to claim 1, further comprising an identification unit configured to identify a user, wherein the evaluation unit evaluates a state of a subject associated with the user identified by the identification unit, and the obtainment unit obtains the demand information associated with the user identified by the identification unit.

12. The control apparatus according to claim 1, wherein the subject is a person, and the state types of the subject are types of facial expressions of the person.

13. An image capturing apparatus, comprising:

an image capturing unit;

the control apparatus according to claim 1; and a recording unit configured to, in a case where the determination unit has determined to cause shooting to be performed, record an image shot by the image capturing unit.

14. A control method for a control apparatus that controls an image capturing apparatus that obtains, through automatic shooting, an image to be provided to a user, the control method comprising:

evaluating a state of a subject;

based on a result of the evaluation made in the evaluating, determining whether to cause the image capturing apparatus to perform shooting;

obtaining, from a demand database, demand information that indicates demand tendencies of a user respectively for state types of the subject; and controlling the determination based on the demand information obtained in the obtaining, wherein in the controlling, the determination is controlled so that a frequency at which the image capturing apparatus performs shooting varies in accordance with magnitudes of demands for the respective state types of the subject.

15. A computer-readable recording medium having recorded therein a program for causing a computer to function as each unit of the control apparatus according to claim 1.

16. An image capturing system that provides, to a user, an image obtained through automatic shooting performed by an image capturing apparatus, the image capturing system including the image capturing apparatus, a control apparatus that controls the image capturing apparatus, and a collection server that collects demand tendencies of the user based on the image provided to the user, the control apparatus comprises:

at least one processor and/or circuit; and at least one memory storing computer program, which causes the at least one processor and/or circuit to function as the following units:

an evaluation unit configured to evaluate a state of a subject;

a determination unit configured to, based on a result of the evaluation made by the evaluation unit, determine whether to cause the image capturing apparatus to perform shooting;

an obtainment unit configured to obtain, from a demand database on the collection server, demand information that indicates demand tendencies of a user respectively for state types of the subject; and a control unit configured to control an operation of the determination unit based on the demand information obtained by the obtainment unit, wherein the control unit controls the operation of the determination unit so that a frequency at which the image capturing apparatus performs shooting varies in accordance with magnitudes of demands for the respective state types of the subject.

17. The control apparatus according to claim 1, wherein the control unit controls the operation of the determination unit so that the frequency at which the image capturing apparatus performs shooting varies in accordance with information on a degree of demand corresponding to the state of the subject evaluated by the evaluation unit, the information being included in the demand information.

* * * * *